United States Patent
Arfa et al.

(10) Patent No.: US 10,558,759 B1
(45) Date of Patent: Feb. 11, 2020

(54) CONSUMER INSIGHTS ANALYSIS USING WORD EMBEDDINGS

(71) Applicant: Facebook, Inc., Menlo Park, CA (US)

(72) Inventors: Jonathan Michael Arfa, New York, NY (US); Nikhil Girish Nawathe, New York, NY (US); Bryan Kauder, New York, NY (US); Shriram Subramanian, New York, NY (US); Alyx Catherine Stevens, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/862,057

(22) Filed: Jan. 4, 2018

(51) Int. Cl.
　　*G06F 17/27*　　(2006.01)
　　*G06N 20/00*　　(2019.01)
　　*H04L 12/58*　　(2006.01)

(52) U.S. Cl.
　　CPC ........ *G06F 17/2785* (2013.01); *G06F 17/278* (2013.01); *G06N 20/00* (2019.01); *H04L 51/32* (2013.01)

(58) Field of Classification Search
　　CPC .. G06F 17/2785; G06F 17/278; G06F 16/285; G06F 16/3326; G06F 17/21; G06F 17/277; G06N 20/00; H04L 51/32; H04L 67/22; G06Q 50/01
　　See application file for complete search history.

(56) References Cited

U.S. PATENT DOCUMENTS

| | | | |
|---|---|---|---|
| 2009/0099996 A1* | 4/2009 | Stefik | G06N 5/022 706/54 |
| 2012/0042022 A1* | 2/2012 | Sheth | H04L 51/32 709/206 |
| 2013/0253910 A1* | 9/2013 | Turner | G06F 17/274 704/9 |
| 2015/0081725 A1* | 3/2015 | Ogawa | G06Q 50/01 707/754 |
| 2015/0127653 A1* | 5/2015 | Keng | G06F 16/285 707/740 |
| 2015/0142888 A1* | 5/2015 | Browning | G06F 16/285 709/204 |
| 2016/0162474 A1* | 6/2016 | Agarwal | G06F 17/2765 704/9 |
| 2016/0364733 A1* | 12/2016 | Fei | G06Q 30/0202 |
| 2017/0091692 A1* | 3/2017 | Guo | G06F 16/58 |
| 2018/0253496 A1* | 9/2018 | Natchu | G06F 16/951 |

* cited by examiner

Primary Examiner — Andrew C Flanders
(74) Attorney, Agent, or Firm — Baker Botts L.L.P.

(57) ABSTRACT

In one embodiment, a method includes receiving a request to generate k words that each approximates a representation of a relationship between two concepts, where the request includes two input n-grams that each represent one of the two concepts, accessing a table of word vector relationships, where the table includes a plurality of unique n-grams and their corresponding word vectors, looking up word vectors corresponding to each of the two input n-grams using the table, calculating an average vector of the word vectors corresponding to the two input n-grams, selecting, using the table and based on a similarity metric, k word vectors closest to the average vector in the embedding space, identifying, for each of the selected word vectors, a corresponding n-gram by looking up the selected word vector in the table, and sending a response message, the response message comprising the identified n-grams.

17 Claims, 21 Drawing Sheets

500

510 — receiving, from a second computing device, a request to generate $k$ words that each approximates a representation of a relationship between two concepts, wherein the request comprises two input $n$-grams that each represents one of the two concepts 520 — accessing a table of word vector relationships, wherein the table of word vector relationships comprises a plurality of unique $n$-grams and their corresponding word vectors, wherein each of the word vectors represents a semantic context of a corresponding $n$-gram as a point in a $d$-dimensional embedding space 530 — looking up, using the table, word vectors corresponding to each of the two input $n$-grams 540 — calculating an average vector by taking a weighted average of the word vectors corresponding to the two input $n$-grams 550 — selecting, using the table and based on a similarity metric, $k$ word vectors closest to the average vector in the embedding space 560 — identifying, for each of the selected word vectors, a corresponding $n$-gram by looking up the selected word vector in the table 570 — sending, to the second computing device, a response message, the response message comprising the identified $n$-grams

1510 — receiving, from a second computing device, a request to identify public sentiments for one or more entities, wherein the request comprises names of the one or more entities and a plurality of attribute $n$-grams, wherein each of the attribute $n$-grams represents an attribute among a plurality of pre-determined attributes 1520 — accessing a table of word vector relationships, wherein the table of word vector relationships comprises a plurality of unique $n$-grams and their corresponding word vectors, wherein each of the word vectors represents a semantic context of a corresponding $n$-gram as a point in a $d$-dimensional embedding space 1530 — looking up, using the table, entity word vectors corresponding to each of the names for the one or more entities and attribute word vectors corresponding to each of the plurality of attribute $n$-grams 1540 — calculating, for each of the entity word vectors, a similarity metric to each of the attribute word vectors 1550 — sending, to the second computing device, a response message, wherein the response message comprises calculated similarity metrics corresponding to all the pairs of an entity word vector and an attribute word vector

*FIG. 15*

|  | adums 1601 | buh 1602 | coork 1603 | heineck 1604 | naffy 1605 | syner 1606 |
|---|---|---|---|---|---|---|
| 1601 adums | 1.000000 | 0.391802 | 0.478992 | 0.378498 | 0.395456 | 0.512314 |
| 1602 buh | 0.391802 | 1.000000 | 0.835780 | 0.513541 | 0.727590 | 0.390529 |
| 1603 coork | 0.478992 | 0.835780 | 1.000000 | 0.653670 | 0.843061 | 0.492161 |
| 1604 heineck | 0.378498 | 0.513541 | 0.653670 | 1.000000 | 0.524147 | 0.482351 |
| 1605 naffy | 0.395456 | 0.727590 | 0.843061 | 0.524147 | 1.000000 | 0.476715 |
| 1606 syner | 0.512314 | 0.390529 | 0.492161 | 0.482351 | 0.476715 | 1.000000 |

1710 — receiving, from a second computing device, a request to identify a similarity in public sentiments for each pair from a plurality of entities, wherein the request comprises names of the plurality of entities 1720 — accessing a table of word vector relationships, wherein the table of word vector relationships comprises a plurality of unique $n$-grams and their corresponding word vectors, wherein each of the word vectors represents a semantic context of a corresponding $n$-gram as a point in a $d$-dimensional embedding space 1730 — looking up, using the table, word vectors corresponding to each of the names 1740 — calculating, for each of the word vectors, a similarity metric to each of the word vectors 1750 — sending, to the second computing device, a response message, wherein the response message comprises calculated similarity metrics corresponding to all the pairs of the word vectors

*FIG. 17*

CONSUMER INSIGHTS ANALYSIS USING WORD EMBEDDINGS

TECHNICAL FIELD

This disclosure generally relates to analyzing public insights based on a word embedding model trained with a corpus of text generated by users of an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the social-networking system may analyze public insights based on a word embedding model that is trained with a large corpus of text collected from content objects created by the online social network users. An n-gram may be represented as a vector in a d-dimensional embedding space, where the vector may represent the semantic context of the corresponding n-gram as a point in the vector space. The vector may be referred to as a word embedding. Each vector may comprise coordinates corresponding to a particular point in the embedding space, where each coordinate corresponds to a particular feature. A similarity metric of two vectors in the embedding space can be calculated. A similarity metric may be a cosine similarity, a Euclidean distance, a Jaccard similarity coefficient, or any suitable similarity metric. A similarity metric of two vectors may represent how the two corresponding n-grams are semantically similar to one another. A word embedding model may be trained with a large corpus of text. A dictionary to map a plurality of unique n-grams to corresponding word vectors may be created using the trained word embedding model. When a word vector for an n-gram is needed, the word vector may be searched by looking up the n-gram in the dictionary. Alternatively, an n-gram may be mapped to a vector representation in the embedding space by processing the n-gram with the word embedding model. The word embedding model may be a machine learning model (e.g., a neural network). An online social network may be able to train the word embedding model with a corpus of text generated by a large number of the online social network users. Because the online social network users may represent general population well, word vectors in the embedding space generated by the online social network may properly reflect sentiments of the contemporary public.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references in the attached claims are chosen for formal reasons only. However any subject matter resulting from a deliberate reference to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5 illustrates an example method for identifying k words approximating a relationship between two concepts on receiving a request.

FIG. 15 illustrates an example method for identifying public sentiments for one or more entities on receiving a request.

FIG. 16 illustrates an example similarity metrics for each pair of entities.

FIG. 17 illustrates an example method for identifying a similarity in public sentiments for each pair from a plurality of entities.

DESCRIPTION OF EXAMPLE EMBODIMENTS

Figure 1A:
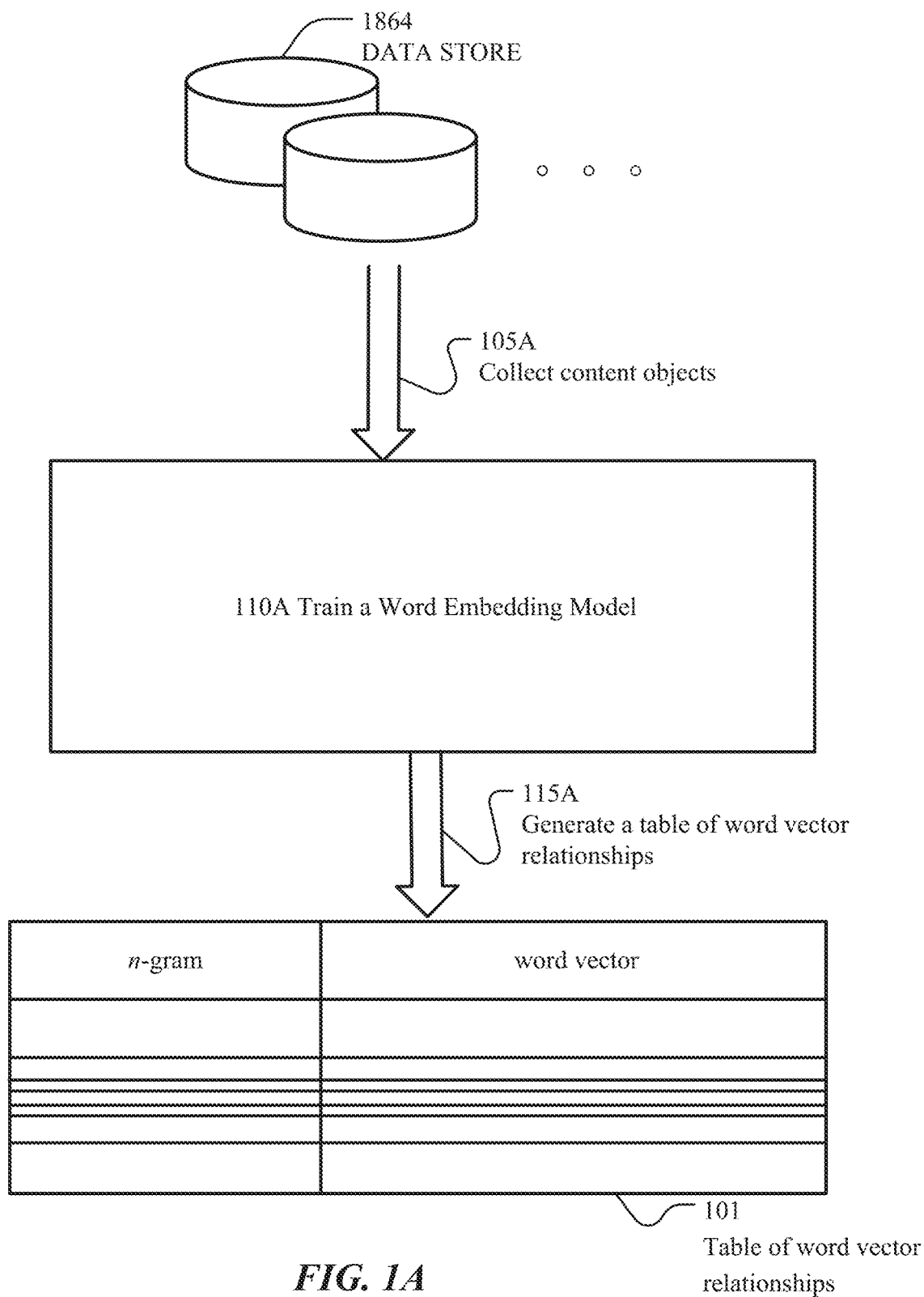
FIGS. 1A-1B illustrate example procedures of training a word embedding model using a corpus of text collected from content objects created by online social network users.

In particular embodiments, the social-networking system 1860 may analyze public sentiments based on word embeddings generated by a word embedding model that is trained with a large corpus of text collected from content objects created by the online social network users. An n-gram may be represented as a vector in a d-dimensional embedding space, where the vector may represent the semantic context of the corresponding n-gram as a point in the vector space. The vector may be referred to as a word embedding. Each vector may comprise coordinates corresponding to a particular point in the embedding space, where each coordinate corresponds to a particular feature. A similarity metric of two vectors in the embedding space can be calculated. A similarity metric may be a cosine similarity, a Euclidean distance, a Jaccard similarity coefficient, or any suitable similarity metric. A similarity metric of two vectors may represent how the two corresponding n-grams are semantically similar to one another. A word embedding model may be trained with a large corpus of text. A dictionary to map a plurality of unique n-grams to corresponding word vectors may be created using the trained word embedding model. When a word vector for an n-gram is needed, the word vector may be searched by looking up the n-gram in the dictionary. Alternatively, an n-gram may be mapped to a vector representation in the embedding space by processing the n-gram with the word embedding model. The word embedding model may be a machine learning model (e.g., a neural network). An online social network may be able to train the word embedding model with a corpus of text generated by a large number of the online social network users. Because the online social network users may represent general population well, word vectors in the embedding space generated by the online social network may properly reflect sentiments of the contemporary public.

Training a Word Embedding Model

In particular embodiments, the social-networking system 1860 may construct a corpus of text by collecting text content from content objects created by users of the online social network. In particular embodiments, the social-networking system 1860 may collect text content from only content objects created during a pre-determined period of time. The social-networking system 1860 may train a word embedding model using the corpus of text as training data, where the word embedding model may generate a word vector for a given input n-gram. The word vector may represent a semantic context of the corresponding n-gram as a point in a d-dimensional embedding space. The social-networking system 1860 may identify a list of unique n-grams appearing in the corpus of text. The social-networking system 1860 may generate, using the word embedding model, a table of word vector relationships comprising the list of unique n-grams and their corresponding word vectors. The table of word vector relationships may be referred to as an embedding dictionary. The table may represent results of the word embedding model trained using the corpus of text as training data. The word embedding model may be trained using a word embedding training framework (e.g., Fasttext). Because the online social network users may represent general population well and a number of the collected content objects for training the word embedding model is large, word vectors in the table may properly reflect insights of the contemporary public. In particular embodiments, the social-networking system 1860 may need to analyze insights of a particular subset of users. The particular subset may be characterized by one or more conditions. In such a case, the social-networking system 1860 may construct a corpus of text by collecting text content from content objects created by online social network users that satisfy the one or more conditions. In particular embodiments, the social-networking system 1860 may collect text content from only content objects created during a pre-determined period of time. The social-networking system 1860 may train the word embedding model using the corpus of text as training data. The social-networking system 1860 may identify a list of unique n-grams appearing in the corpus of text. The social-networking system 1860 may generate the table of word vector relationships using the word embedding model. The word vectors in the table may properly reflect insights of the group of users because the word embedding model was trained using a large corpus of text created by the group of users as training data. Although this disclosure describes training a word embedding model with a large corpus of text collected from content objects created by the online social network users in a particular manner, this disclosure contemplates training a word embedding model with a large corpus of text collected from content objects created by the online social network users in any suitable manner.

FIG. 1A illustrates an example procedure of training a word embedding model using a corpus of text collected from content objects created by online social network users. At step 105A, the social-networking system 1860 may collect content objects from one or more data store 1864 of the online social network. The social-networking system 1860 may collect only content objects created during a pre-determined period of time. The social-networking system 1860 may construct a corpus of text by collecting text content from the content objects. At step 110A, the social-networking system 1860 may train a word embedding model using the corpus of text as training data. At step 115A, the social-networking system 1860 may generate a table of word vector relationships. To generate the table, the social-networking system 1860 may identify a list of unique n-grams appearing in the corpus of text. For each of the n-grams in the identified list, the social-networking system 1860 may generate a corresponding word vector using the trained word embedding model. Although this disclosure describes training a word embedding model using a corpus of text collected from content objects in the online social network in a particular manner, this disclosure contemplates training a word embedding model using a corpus of text collected from content objects in the online social network in any suitable manner.

In particular embodiments, the social-networking system 1860 may construct a corpus of text by collecting text content from content objects created by users of the online social network. An online social network may have a large number of users. The users may generate content objects to express themselves. User-generated content may include anything a user can add, upload, send, or "post" to social-networking system 1860. As an example and not by way of limitation, a user communicates posts to social-networking system 1860 from a client system 1830. Posts may include data such as status updates or other textual data, location information, photos, videos, links, music or other similar data or media. In particular embodiments, public sentiments on a particular subject may change over time. The social-networking system 1860 may collect text content from only content objects created during a pre-determined period of time. The pre-determined period of time may, for example, be the last one year to ensure that the word vectors generated by the word embedding model reflect up-to-date public insights. Although this disclosure describes constructing a corpus of text by collecting text content from user-generated content objects in a particular manner, this disclosure contemplates constructing a corpus of text by collecting text content from user-generated content objects in any suitable manner.

In particular embodiments, the social-networking system 1860 may train a word embedding model using the corpus of text as training data, where the word embedding model may generate a word vector for a given input n-gram. The word embedding model may be a machine learning model (e.g., a neural network). The word vector may represent a semantic context of the corresponding n-gram as a point in a d-dimensional embedding space. The word embedding model may utilize either of two model architectures to produce a distributed representation of words: continuous bag-of-words (CBOW) or continuous skip-gram. In the continuous bag-of-words architecture, the word embedding model may predict the current word from a window of surrounding context words. The order of context words may not influence prediction. In the continuous skip-gram architecture, the word embedding model may use the current word to predict the surrounding window of context words. The skip-gram architecture may weigh nearby context words more heavily than more distant context words. Although this disclosure describes training a word embedding model in a particular manner, this disclosure contemplates training a word embedding model in any suitable manner.

In particular embodiments, the social-networking system 1860 may identify a list of unique n-grams appearing in the corpus of text. The social-networking system 1860 may generate, using the word embedding model, a table of word vector relationships 101 comprising the list of unique n-grams and their corresponding word vectors. In particular embodiments, the table of word vector relationships 101 may be generated as a result of training the word embedding model. The table of word vector relationships 101 may be referred to as an embedding dictionary. The table 101 may represent results of the word embedding model trained using the corpus of text as training data. The online social network users may represent general population without bias thanks to a large number of users. Also, a number of the collected content objects for training the word embedding model may be large. Therefore, word vectors in the table 101 may properly reflect insights of the contemporary public. Although this disclosure describes generating a table of word vector relationships in a particular manner, this disclosure contemplates generating a table of word vector relationships in any suitable manner.

Figure 1B:
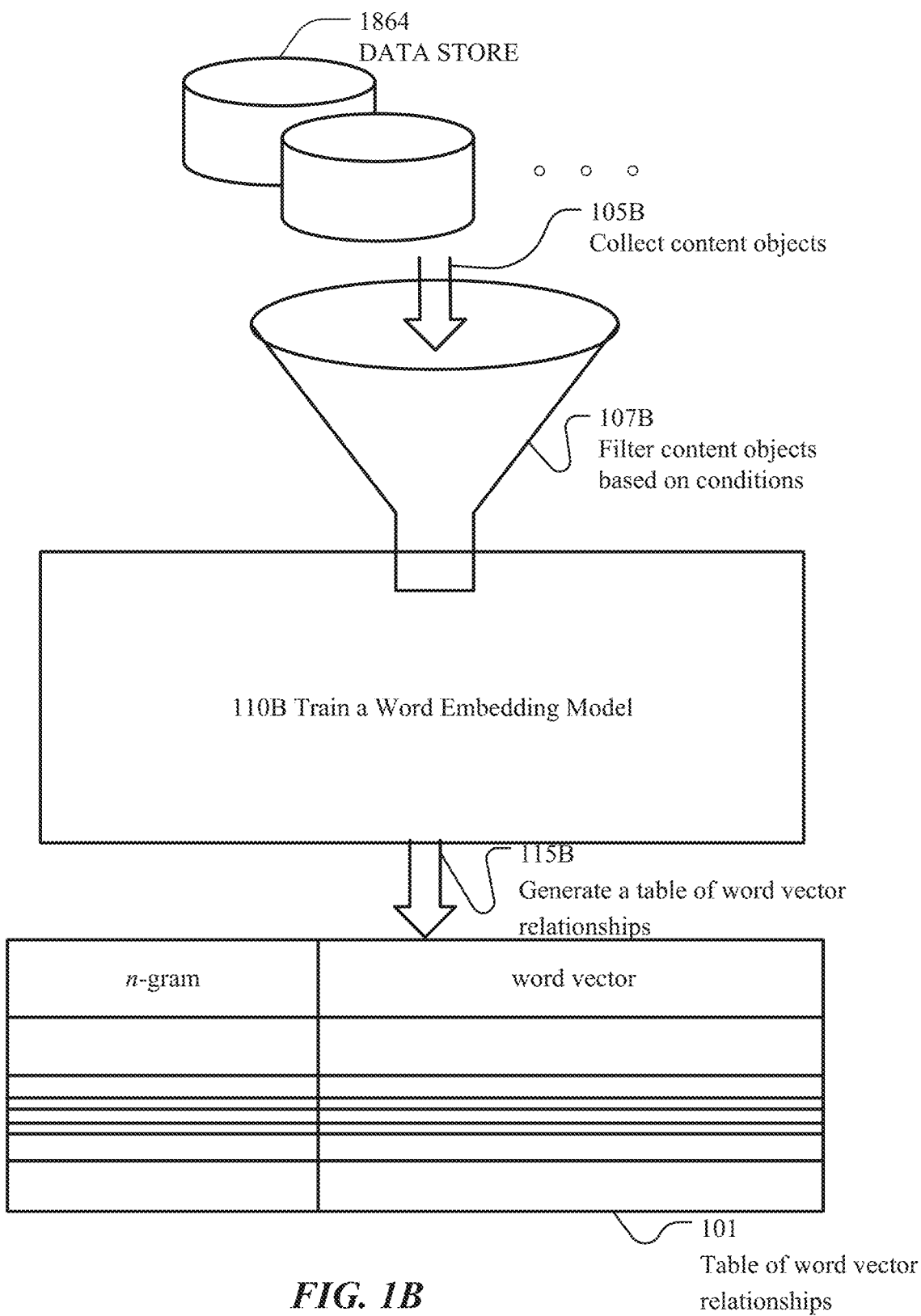

FIG. 1B illustrates an example procedure of training a word embedding model using a corpus of text collected from content objects created by a particular group of online social network users. The particular group may be characterized by one or more conditions. At step 105B, the social-networking system 1860 may collect content objects from one or more data store 1864 of the online social network. At step 107B, the social-networking system 1860 may filter the content objects and collect a content object if the generating user satisfies the one or more conditions. The social-networking system 1860 may collect only content objects created during a pre-determined period of time. The social-networking system 1860 may construct a corpus of text by collecting text content from the collected content objects. At step 110B, the social-networking system 1860 may train a word embedding model using the corpus of text as training data. At step 115B, the social-networking system 1860 may generate a table of word vector relationships. To generate the table, the social-networking system 1860 may identify a list of unique n-grams appearing in the corpus of text. For each of the n-grams in the identified list, the social-networking system 1860 may generate a corresponding word vector using the trained word embedding model. Although this disclosure describes training a word embedding model using a corpus of text collected from content objects generated by a group of users in a particular manner, this disclosure contemplates training a word embedding model using a corpus of text collected from content objects generated by a group of users in any suitable manner.

In particular embodiments, the social-networking system 1860 may need to analyze insights of a particular subset of the online social network users. The particular subset may be characterized by one or more conditions. In such a case, the social-networking system 1860 may construct a corpus of text by collecting text content from content objects created by online social network users that satisfy the one or more conditions. In particular embodiments, the social-networking system 1860 may collect text content from only content objects created during a pre-determined period. The social-networking system 1860 may train the word embedding model using the corpus of text as training data. The social-networking system 1860 may identify a list of unique n-grams appearing in the corpus of text. The social-networking system 1860 may generate the table of word vector relationships 101 using the word embedding model. The word vectors in the table 101 may properly reflect insights of the group of users because the word embedding model was trained using a large corpus of text created by the group of users as training data. As an example and not by way of limitation, the social-networking system 1860 may want to analyze sentiments of young mothers regarding a particular subject. Young mothers may be characterized by a list of conditions including being a female, aged between 25 and 44, and having one or more children. The social-networking system 1860 may construct a corpus of text from content objects created by users that satisfy the conditions. The social-networking system 1860 may train the word embedding model using the constructed corpus of text as training data. The social-networking system 1860 may generate the table of word vector relationships by using the trained word embedding model. Although this disclosure describes training a word embedding model by collecting text from content objects generated by a subset of users in a particular manner, this disclosure contemplates training a word embedding model by collecting text from content objects generated by a subset of users in any suitable manner.

Keywords Generation

In particular embodiments, the social-networking system 1860 may generate k keywords related to a particular subject on receiving a request from a computing device. The request may include an input n-gram representing the particular subject. In particular embodiments, the request may comprise one or more conditions characterizing an audience. In such a case, the social-networking system 1860 may train the word embedding model with a corpus of text collected from content objects created by a group of users who satisfy the one or more conditions. The social-networking system 1860 may access the table of word vector relationships 101. The social-networking system 1860 may look up a first word vector corresponding to the input n-gram using the table 101. The social-networking system 1860 may, for each n-gram in the table 101, calculate a similarity metric to the first word vector. The social-networking system 1860 may select k word vectors from the word vectors in the table 101 closest to the first word vector in the embedding space based on the calculated similarity metric. In particular embodiments, the similarity metric is a cosine similarity. In particular embodiments, the similarity metric is a Euclidean distance. In particular embodiments, the similarity metric is a Jaccard similarity coefficient. The social-networking system 1860 may identify a corresponding n-gram for each of the selected word vectors by looking up the selected word vector in the table 101. The social-networking system 1860 may send a response message to the computing device. The response message may include the identified n-grams. The identified n-grams may be semantically close to the particular subject because their corresponding word vectors are close to the first word vector corresponding to the input n-gram representing the particular subject. A third-party user associated with the computing device may evaluate public sentiments regarding the particular subject based on the generated keywords. Although this disclosure describes generating a plurality of keywords related to a particular subject in a particular manner, this disclosure contemplates generating a plurality of keywords related to a particular subject in any suitable manner.

In particular embodiments, the social-networking system 1860 may receive a request to generate k keywords related to a particular subject from a computing device. A third-party user associated with the computing device may want to understand a number of keywords that are close to a particular subject in public perceptions. The request may include an input n-gram representing the particular subject. In particular embodiments, the request may comprise one or more conditions characterizing an audience. In such a case, the social-networking system 1860 may train the word embedding model with a corpus of text collected from content objects created by a group of users who satisfy the one or more conditions. As an example and not by way of limitation, a third-party user may want to understand keywords close to 'family' because the third-party user may want to create ad strategies focusing on family for a product. The social-networking system 1860 may receive a request to generate k keywords contextually tied closely with 'family.' Although this disclosure describes receiving a request to generate keywords close to a particular subject in a particular manner, this disclosure contemplates receiving a request to generate keywords close to a particular subject in any suitable manner.

Figure 2:
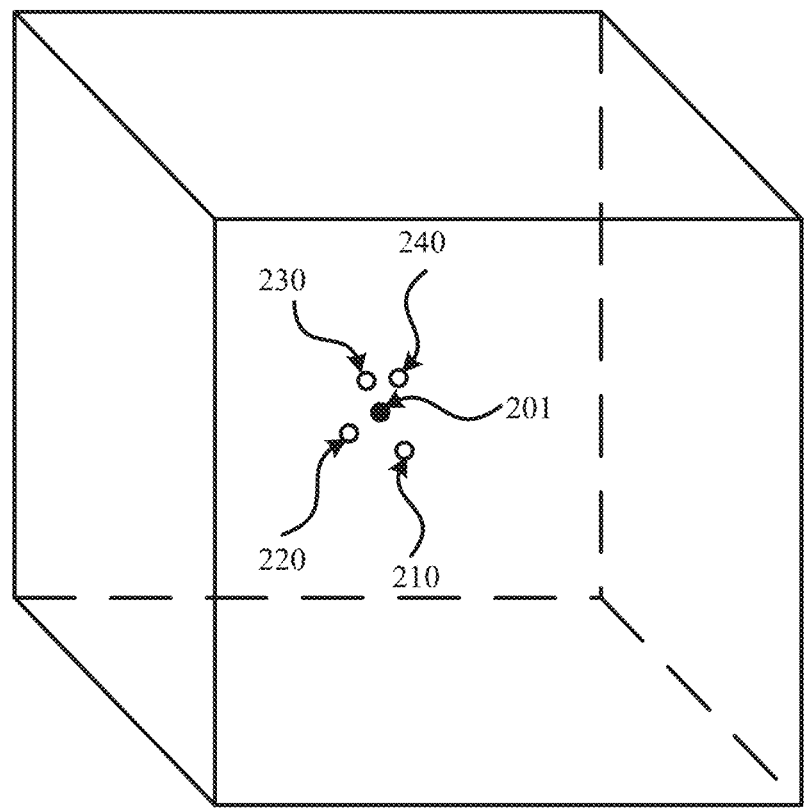
FIG. 2 illustrates an example of identifying a number of word vectors closest to a word vector corresponding to a particular subject.

FIG. 2 illustrates an example of identifying a number of word vectors closest to a word vector corresponding to a particular subject. In particular embodiments, the social-networking system 1860 may access the table of word vector relationships 101. The social-networking system 1860 may look up a word vector corresponding to the input n-gram by looking up the input n-gram in the table 101. The word vector corresponding to the input n-gram may be represented as a first point 201 in the embedding space 1900. The table 101 may include all the mono-grams and selected multi-grams appeared in the corpus of text. In other words, the table 101 may include all the vocabularies that users are using in their content objects. The social-networking system 1860 may, for each n-gram in the table 101, calculate a similarity metric to the first word vector. The social-networking system 1860 may select k word vectors from the word vectors in the table 101 closest to the first word vector in the embedding space based on the calculated similarity metric. In particular embodiments, the similarity metric is a cosine similarity. In particular embodiments, the similarity metric is a Euclidean distance. In particular embodiments, the similarity metric is a Jaccard similarity coefficient. In the example illustrated in FIG. 2, the social-networking system 1860 selects four word vectors 210, 220, 230, and 240 from the word vectors in the table 101 because they are closest to the first word vector 201. In particular embodiments, the social-networking system 1860 may identify a corresponding n-gram for each of the selected word vectors by looking up the selected word vector in the table 101. As an example and not by way of limitation, continuing with the prior example, the social-networking system 1860 may look up a first word vector 201 corresponding to the input n-gram 'family.' By computing a similarity metric for each word vectors in the table 101 with the first word vector 201, the social-networking system 1860 may select four closest word vectors: 210, 220, 230, and 240. The social-networking system 1860 may identify that the corresponding n-grams for the word vectors 210, 220, 230, and 240 are 'cousin,' 'condolences,' 'relatives,' and 'grandchildren' by looking up the word vectors 210, 220, 230 and 240 in the table 101. Although this disclosure describes identifying closest keywords for a particular subject in a particular manner, this disclosure contemplates identifying closest keywords for a particular subject in any suitable manner.

The social-networking system 1860 may send a response message to the computing device. The response message may include the identified n-grams. The identified n-grams may be semantically close to the particular subject because their corresponding word vectors are close to the first word vector corresponding to the input n-gram representing the particular subject. A third-party user associated with the computing device may evaluate public sentiments regarding the particular subject based on the generated keywords. As an example and not by way of limitation, continuing with the prior example, the social-networking system 1860 may send a response including 'cousin,' 'condolences,' 'relatives,' and 'grandchildren' as identified top keywords closely related to 'family.' The third-party user may decide to focus on 'relatives' and 'grandchildren' when the third-party user creates the ad strategies based on the identified keywords. Although this disclosure describes sending the identified keywords in a particular manner, this disclosure contemplates sending the identified keywords in any suitable manner.

Figure 3:
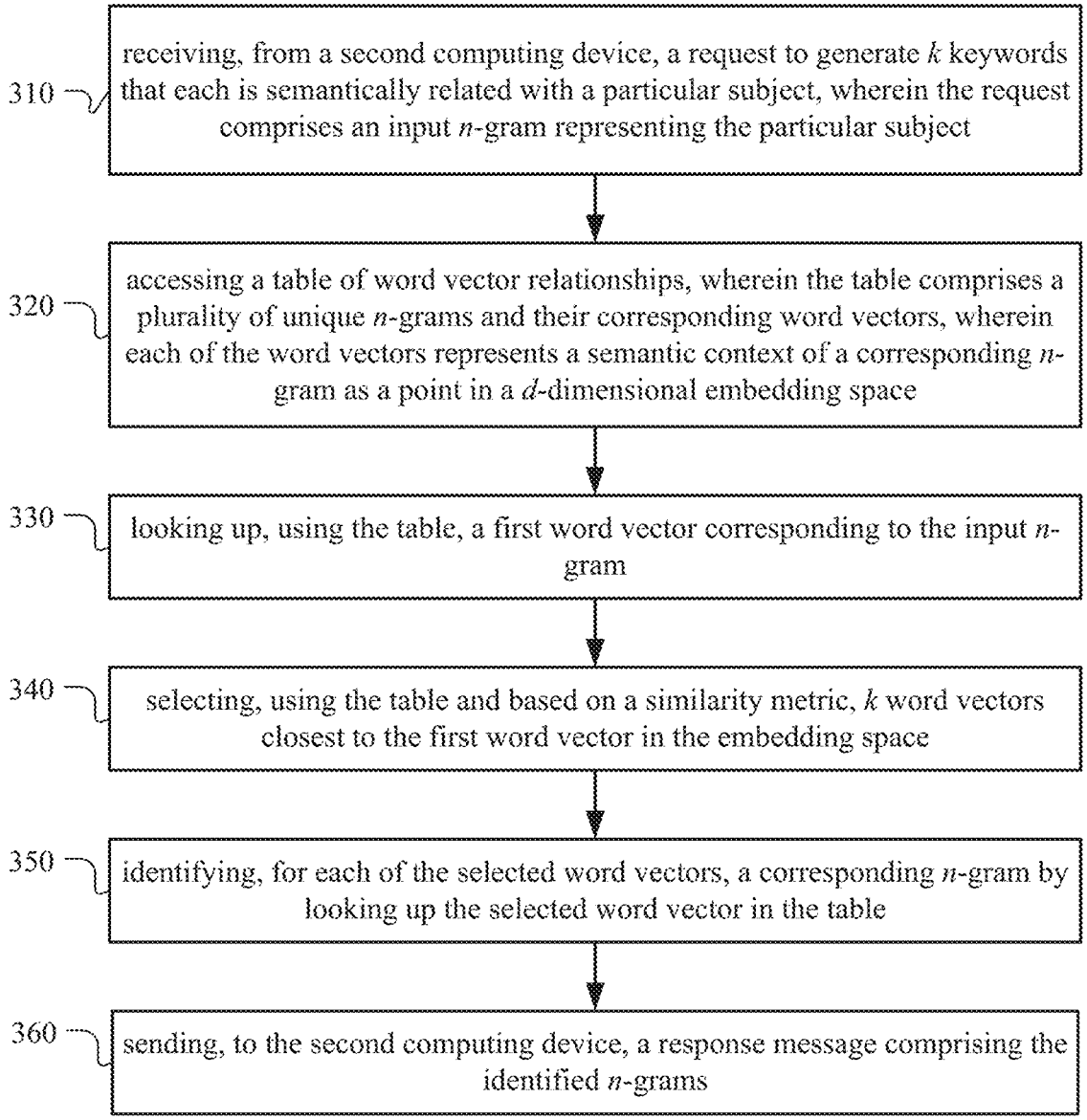
FIG. 3 illustrates an example method for identifying k keywords related to a particular subject on receiving a request.

FIG. 3 illustrates an example method 300 for identifying k keywords related to a particular subject on receiving a request. The method may begin at step 310, where the social-networking system 1860 may receive, from a second computing device, a request to generate k keywords each of which is semantically related to a particular subject, wherein the request comprises an input n-gram representing the particular subject. At step 320, the social-networking system 1860 may access a table of word vector relationships, wherein the table comprises a plurality of unique n-grams and their corresponding word vectors, wherein each of the word vectors represents a semantic context of a corresponding n-gram as a point in a d-dimensional embedding space. At step 330, the social-networking system 1860 may look up, using the table, a first word vector corresponding to the input n-gram. At step 340, the social-networking system 1860 may select, using the table and based on a similarity metric, k word vectors closest to the first word vector in the embedding space. At step 350, the social-networking system 1860 may identify, for each of the selected word vectors, a corresponding n-gram by looking up the selected word vector in the table. At step 360, the social-networking system 1860 may send, to the second computing device, a response message comprising the identified n-grams. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for identifying k keywords related to a particular subject on receiving a request including the particular steps of the method of FIG. 3, this disclosure contemplates any suitable method for identifying k keywords related to a particular subject on receiving a request including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Concept Intersection

In particular embodiments, the social-networking system 1860 may receive a request to generate k words that each approximates a representation of a relationship between two concepts from a computing device. The request may include two input n-grams that each represents one of the two concepts. In particular embodiments, the request may comprise one or more conditions characterizing an audience. In such a case, the social-networking system 1860 may train the word embedding model with a corpus of text collected from content objects created by a group of users who satisfy the one or more conditions. The social-networking system 1860 may access a table of word vector relationships 101. The social-networking system 1860 may look up word vectors corresponding to each of the two input n-grams by looking up the two input n-grams in the table 101. The social-networking system 1860 may calculate an average vector by taking a weighted average of the word vectors corresponding to the two input n-grams. The social-networking system 1860 may assign a weight to each of the two word vectors for calculating the weighted average. The weight assigned to a word vector may be an Inverse Document Frequency (IDF) score for the corresponding n-gram. The IDF score may be based on a number of documents containing the corresponding n-gram in a corpus of text. The IDF score for an n-gram may be a measure reflecting the specificity of the n-gram. The social-networking system 1860 may, for each n-gram in the table 101, calculate a similarity metric to the average vector. The social-networking system 1860 may select k word vectors from the word vectors in the table 101 closest to the average vector in the embedding space 1900. In particular embodiments, the similarity metric is a cosine similarity. In particular embodiments, the similarity metric is a Euclidean distance. In particular embodiments, the similarity metric is a Jaccard similarity coefficient. The social-networking system 1860 may identify a corresponding n-gram for each of the selected word vectors by looking up the selected word vector in the table. The social-networking system 1860 may send a response message to the computing device. The response message may include the identified n-grams. The identified n-grams may approximate a representation of a relationship between two concepts represented by the input n-grams. Although this disclosure describes generating a plurality of n-grams approximating a representation of a relationship between two concepts in a particular manner, this disclosure contemplates generating a plurality of n-grams approximating a representation of a relationship between two concepts in any suitable manner.

In particular embodiments, the social-networking system 1860 may receive a request to generate k words that each approximates a representation of a relationship between two concepts from a computing device. The online social network may have a large corpus of text collected from content objects generated by users. Because a number of users generating the content objects may be large and the users may be well distributed in terms of demographics, the corpus of text may represent contemporary public sentiments. A third-party user associated with the computing device may want to understand a relationship between two concepts. The third-party user may send the request to the social-networking system 1860. The request may include two input n-grams that each represents one of the two concepts. In particular embodiments, the request may comprise one or more conditions characterizing an audience. In such a case, the social-networking system 1860 may train the word embedding model with a corpus of text collected from content objects created by a group of users who satisfy the one or more conditions. As an example and not by way of limitation, a cereal manufacturer may want to initiate a promotional campaign for a new breakfast cereal. The manufacturer has determined "positive energy" as a main theme for the campaign. The manufacturer may want to understand a relationship between the main theme and a target audience (e.g., moms of age between 25 and 44). The social-networking system 1860 may receive a request to generate k words that approximates a representation of a relationship between 'positivity' and 'mom.' The request may also include conditions characterizing the target audience such as female, age between 25 and 44, and having a child. The social-networking system 1860 may construct the corpus of text by collecting content objects created by users that satisfy the conditions. The social-networking system 1860 may train the word embedding model using the corpus of text as training data. The social-networking system 1860 may generate a table of word vector relationships 101 using the trained word embedding model. As another example and not by way of limitation, the cereal manufacturer may also want to understand a relationship between the main theme (i.e., positive energy, or positivity) and the target product (i.e., breakfast). The social-networking system 1860 may receive a request to generate k words that approximates a representation of a relationship between 'positivity' and 'breakfast.' Although this disclosure describes receiving a request to generate words approximating a representation of a relationship between two concepts in a particular manner, this disclosure contemplates receiving a request to generate words approximating a representation of a relationship between two concepts in any suitable manner.

Figure 4:
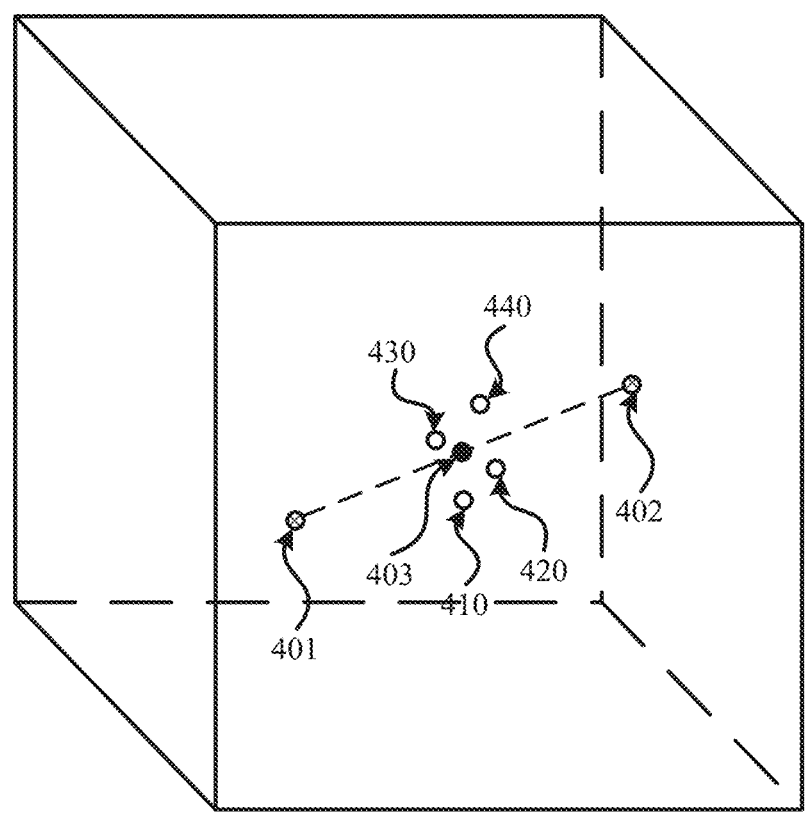
FIG. 4 illustrates an example of identifying k word vectors closest to an average vector that represents a relationship between two concepts.

FIG. 4 illustrates an example of identifying k word vectors closest to an average vector that represents a relationship between two concepts. In particular embodiments, the social-networking system 1860 may access a table of word vector relationships 101. The social-networking system 1860 may look up word vectors 401, 402 corresponding to each of the two input n-grams by looking up the two input n-grams in the table 101. The social-networking system 1860 may calculate an average vector 403 by taking a weighted average of the word vectors corresponding to the two input n-grams. The social-networking system 1860 may assign a weight to each of the two word vectors for calculating the weighted average. The weight assigned to a word vector may be an Inverse Document Frequency (IDF) score for the corresponding n-gram. The IDF score may be based on a number of documents containing the corresponding n-gram in a corpus of text. Though certain terms, such as 'is,' 'of,' and 'that,' may appear a lot of times, those terms have little importance. Thus, the IDF score may weigh down the frequent terms while scale up the rare terms. The IDF score for an n-gram may be a measure reflecting specificity of the n-gram. As an example and not by way of limitation, continuing with the prior example, the social-networking system 1860 may identify two word vectors 401 and 402 corresponding to 'positivity' and 'moms,' respectively, by looking up 'positivity' and 'moms' in the table 101. The social-networking system 1860 may calculate an average vector 403 by taking an average of two word vectors 401 and 402. As another example and not by way of limitation, the social-networking system 1860 may identify word vector 401 corresponding to 'positivity' and word vector 402 corresponding to 'breakfast' by looking up 'positivity' and 'breakfast' in the table 101. The social-networking system 1860 may calculate an average vector 403 by taking a weighted average of word vectors 401 and 402, where an IDF score for the corresponding word is the weight applied to a word vector. Although this disclosure describes calculating an average word vector in a particular manner, this disclosure contemplates calculating an average word vector in any suitable manner.

In particular embodiments, the social-networking system 1860 may, for each n-gram in the table 101, calculate a similarity metric to the average vector. When the social-networking system 1860 calculates the average vector 403, no word vectors in the table 101 may match the average vector 403. Thus, the social-networking system 1860 may select k word vectors from the word vectors in the table 101 closest to the average vector in the embedding space 1900. The selected k word vectors may approximate a representation of a relationship between the two concepts. In particular embodiments, the similarity metric is a cosine similarity. In particular embodiments, the similarity metric is a Euclidean distance. In particular embodiments, the similarity metric is a Jaccard similarity coefficient. The social-networking system 1860 may identify a corresponding n-gram for each of the selected word vectors by looking up the selected word vector in the table. As an example and not by way of limitation, continuing with the prior example, after the social-networking system 1860 calculates an average vector 403 of word vectors 401 and 402 corresponding to 'positivity' and 'moms,' the social-networking system 1860 may select four word vectors 410, 420, 430, and 440 that are closest to the average vector 403 in terms of the calculated similarity metric. The social-networking system 1860 may identify that the selected word vectors correspond to 'motivation,' 'awesomeness,' vibes; and 'enthusiasm' by looking up the word vectors 410, 420, 430, and 440 in the table 101. As another example and not by way of limitation, the social-networking system 1860 may calculate an average vector 403 by taking a weighted average of word vectors 401 and 402 that correspond to 'positivity' and 'breakfast.' The social-networking system 1860 may select four word vectors 410, 420, 430, and 440 closest to the average vector 403 by comparing the calculated similarity metrics. The social-networking system 1860 may identify that word vectors 410, 420, 430, and 440 correspond to 'motivation,' 'negativity,' 'brunch,' and 'positive' by looking up the word vectors 410, 420, 430, and 440 in the table 101. Although this disclosure describes identifying words approximating a representation of a relationship between two concepts in a particular manner, this disclosure contemplates identifying words approximating a representation of a relationship between two concepts in any suitable manner.

In particular embodiments, the social-networking system 1860 may send a response message to the computing device. The response message may include the identified n-grams. The identified n-grams may approximate a representation of a relationship between two concepts represented by the input n-grams. A third-party user associated with the computing device may evaluate a relationship between two concepts represented by the input n-grams based on the k n-grams in the response message. As an example and not by way of limitation, continuing with the prior example, the social-networking system 1860 may send a response including 'motivation,' 'awesomeness,' 'vibes,' and 'enthusiasm' as identified top words approximating a relationship between 'positivity' and 'moms.' The cereal manufacturer may use the words to determine whether their campaign theme was decided suitably for the target audience and to develop their promotional campaign further. Although this disclosure describes sending the identified words in a particular manner, this disclosure contemplates sending the identified words in any suitable manner.

FIG. 5 illustrates an example method 500 for identifying k words approximating a relationship between two concepts on receiving a request. The method may begin at step 510, where the social-networking system 1860 may receive, from a second computing device, a request to generate k words that each approximates a representation of a relationship between two concepts, wherein the request comprises two input n-grams that each represents one of the two concepts. At step 520, the social-networking system 1860 may access a table of word vector relationships, wherein the table of word vector relationships comprises a plurality of unique n-grams and their corresponding word vectors, wherein each of the word vectors represents a semantic context of a corresponding n-gram as a point in a d-dimensional embedding space. At step 530, the social-networking system 1860 may look up, using the table, word vectors corresponding to each of the two input n-grams. At step 540, the social-networking system 1860 may calculate an average vector by taking a weighted average of the word vectors corresponding to the two input n-grams. At step 550, the social-networking system 1860 may select, using the table and based on a similarity metric, k word vectors closest to the average vector in the embedding space. At step 560, the social-networking system 1860 may identify, for each of the selected word vectors, a corresponding n-gram by looking up the selected word vector in the table. At step 570, the social-networking system 1860 may send, to the second computing device, a response message, the response message comprising the identified n-grams. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for identifying k words approximating a relationship between two concepts on receiving a request including the particular steps of the method of FIG. 5, this disclosure contemplates any suitable method for identifying k words approximating a relationship between two concepts on receiving a request including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Digestible Visualization

In particular embodiments, the social-networking system 1860 may receive a request to generate a two-dimensional visualization of public sentiments regarding a particular subject. The request may include an input n-gram representing the particular subject. In particular embodiments, the request may comprise one or more conditions characterizing an audience. In such a case, the social-networking system 1860 may train the word embedding model with a corpus of text collected from content objects created by a group of users who satisfy the one or more conditions. The social-networking system 1860 may construct a first corpus of text by collecting text containing the input n-gram from a plurality of user-created content objects in the online social network. In case the request comprises one or more conditions characterizing an audience, the social-networking system 1860 may construct the first corpus of text by collecting text containing the input n-gram from a plurality of content-objects in the online social network created by users that satisfy the one or more conditions. The social-networking system 1860 may identify a list of unique n-grams appearing in the first corpus of text. The social-networking system 1860 may generate a first table comprising unique n-grams in the list and their corresponding word vectors using a word embedding model. The social-networking system 1860 may condense the d-dimensional word vectors in the table into a two-dimensional word vectors by performing a t-distributed Stochastic Neighbor Embedding (t-SNE) dimensionality reduction on the word vectors in the first table. The social-networking system 1860 may determine a Term Frequency-Inverse Document Frequency (TF-IDF) ranking of the n-grams in the first table. The social-networking system 1860 may send instructions to display n-grams in the first table on a two-dimensional display space, where each n-gram is placed at a location of the corresponding condensed word vector. In particular embodiments, the instructions may include instructions to adjust a font size for each n-gram based at least on a respective TF-IDF rank assigned to the n-gram. In particular embodiments, the instructions may include instructions to adjust a font color for an n-gram based at least on a respective TF-IDF rank assigned to the n-gram. If a number of n-grams in the first table exceeds a threshold, the instructions may include instructions to display only n-grams with TF-IDF ranks higher than a predetermined value. Although this disclosure describes visualizing public sentiments regarding a particular subject in a particular manner, this disclosure contemplates visualizing public sentiments regarding a particular subject in any suitable manner.

In particular embodiments, the social-networking system 1860 may receive a request to generate a two-dimensional visualization of keywords representing public sentiments regarding a particular subject. The online social network may have a large corpus of text collected from content objects generated by users. Because the number of users generating the content objects may be large and the users may be well distributed in terms of demographics, the corpus of text may represent contemporary public sentiments. A third-party user may want to understand public sentiments around a particular subject. The two-dimensional visualization of keywords representing public sentiments may be an intuitive tool for the third-party user to understand public sentiments. The third-party user may send the request to the social-networking system 1860 to generate a two-dimensional visualization of keywords representing public sentiments regarding the particular subject. The request may include an input n-gram representing the particular subject. In particular embodiments, the request may comprise one or more conditions characterizing an audience. In such a case, the social-networking system 1860 may train the word embedding model with a corpus of text collected from content objects created by a group of users who satisfy the one or more conditions. As an example and not by way of limitation, a third-party user may be studying public perceptions about 'basketball.' The third-party user may want to see a number of keywords closely related to 'basketball' in public sentiments. The third-party user may send a request to visualize keywords representing public sentiments regarding 'basketball' in a two-dimensional space to the social-networking system 1860. Although this disclosure describes receiving a request to generate a two-dimensional visualization of keywords in a particular manner, this disclosure contemplates receiving a request to generate a two-dimensional visualization of keywords in any suitable manner.

In particular embodiments, the social-networking system 1860 may construct a first corpus of text by collecting text containing the input n-gram from a plurality of user-created content objects in the online social network. If the request comprises one or more conditions characterizing an audience, the social-networking system 1860 may construct the first corpus of text by collecting text containing the input n-gram from a plurality of content-objects in the online social network created by users that satisfy the one or more conditions. The social-networking system 1860 may identify a list of unique n-grams appearing in the first corpus of text. The social-networking system 1860 may generate a first table comprising unique n-grams in the list and their corresponding word vectors using a word embedding model. As an example and not by way of limitation, continuing with the prior example, the social-networking system 1860 may collect user-generated content objects that contain 'basketball.' The social-networking system 1860 may construct a corpus of text by collecting text data from the collected content objects. The social-networking system 1860 may generate a table comprising unique n-grams appearing in the corpus of text and their corresponding word vectors. The n-grams in the table co-occur with 'basketball.' Thus, the n-grams in the table may be more related with the concept of 'basketball' than the other n-grams. As another example and not by way of limitation, the request may include 'female,' 'not-married,' and 'age between 20-40' as conditions for the target audience. In that case, the social-networking system 1860 may collect only content objects generated by users satisfying the conditions. The social-networking system 1860 may construct a corpus of text by collecting text data from the collected content objects. The social-networking system 1860 may generate a table comprising unique n-grams appearing in the corpus of text and their corresponding word vectors. Although this disclosure describes generating a table comprising unique n-grams co-occurring with the input n-gram and their corresponding word vectors in a particular manner, this disclosure contemplates generating a table comprising unique n-grams co-occurring with the input n-gram and their corresponding word vectors in any suitable manner.

The social-networking system 1860 may condense the d-dimensional word vectors in the first table into a two-dimensional word vectors by performing a t-distributed Stochastic Neighbor Embedding (t-SNE) dimensionality reduction on the word vectors in the first table. t-SNE is a non-linear dimensionality reduction algorithm used for exploring high-dimensional data. t-SNE maps multi-dimensional data to two or more dimensions suitable for human observation. In particular embodiments, the social-networking system 1860 may condense the d-dimensional word vectors in the first table into a two-dimensional word vectors by using any other suitable dimension reduction algorithms including hierarchical clustering. The social-networking system 1860 may perform a Term Frequency-Inverse Document Frequency (TF-IDF) ranking of the n-grams in the first table. TF-IDF is a way to score the importance of n-grams in a document based on how frequently the n-grams appear across multiple documents. If an n-gram appears frequently in a document, the n-gram may be an important one. The social-networking system 1860 may assign a high score to the n-gram. However, some n-grams (e.g., the, is, a, that) may appear frequently in many documents. The social-networking system 1860 may lower the score for those n-grams as those n-grams are not unique. The social-networking system 1860 may rank the n-grams based on corresponding TF-IDF scores. Although this disclosure describes condensing d-dimensional word vectors into two-dimensional word vectors in a particular manner, this disclosure contemplates condensing d-dimensional word vectors into two-dimensional word vectors in any suitable manner.

Figure 6:
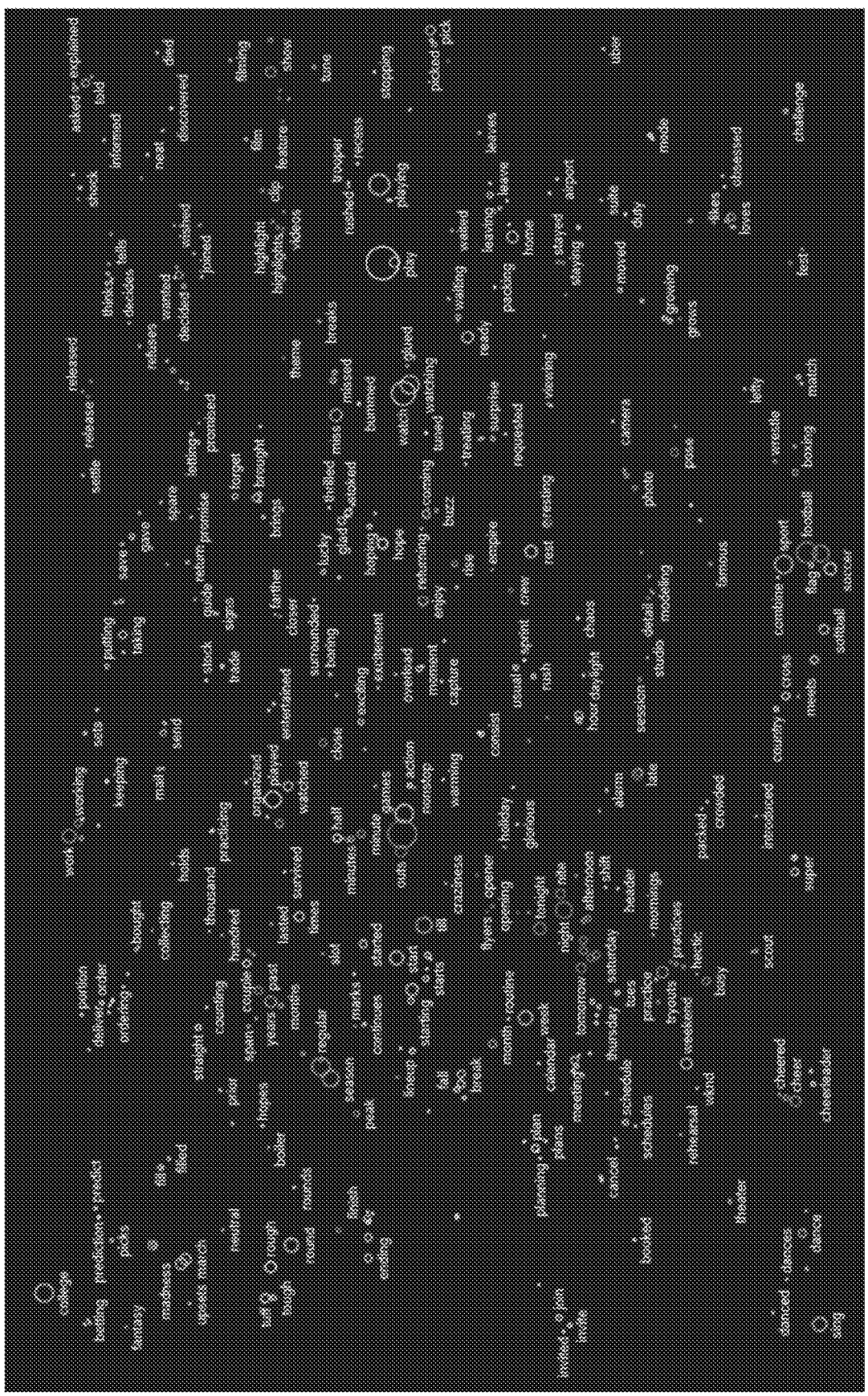
FIG. 6 illustrates an example visualization of public sentiments for a particular subject on a 2-dimensional space.

The social-networking system 1860 may send instructions to display n-grams in the first table on a two-dimensional display space, where each n-gram is placed at a location of the corresponding condensed word vector. In particular embodiments, the instructions may include instructions to adjust a font size for each n-gram based at least on a respective TF-IDF rank assigned to the n-gram. In particular embodiments, the instructions may include instructions to adjust a font color for an n-gram based at least on a respective TF-IDF rank assigned to the n-gram. If a number of n-grams in the first table exceeds a threshold, the instructions may include instructions to display only n-grams with TF-IDF ranks higher than a pre-determined value. FIG. 6 illustrates an example visualization of public sentiments for a particular subject on a 2-dimensional space. As an example and not by way of limitation, continuing with the prior example, the social-networking system 1860 may send a response message including instructions to display n-grams in the table on a two-dimensional display space. As illustrated in FIG. 6, the instructions may include instructions to adjust a font size and a color for an n-gram based on assigned TF-IDF rank. The instructions may include instructions to display only n-grams with TF-IDF ranks higher than a threshold to make sure not too many n-grams are displayed. Although this disclosure describes displaying n-grams in a two-dimensional display space in a particular manner, this disclosure contemplates displaying n-grams in a two-dimensional display space in any suitable manner.

Figure 7:
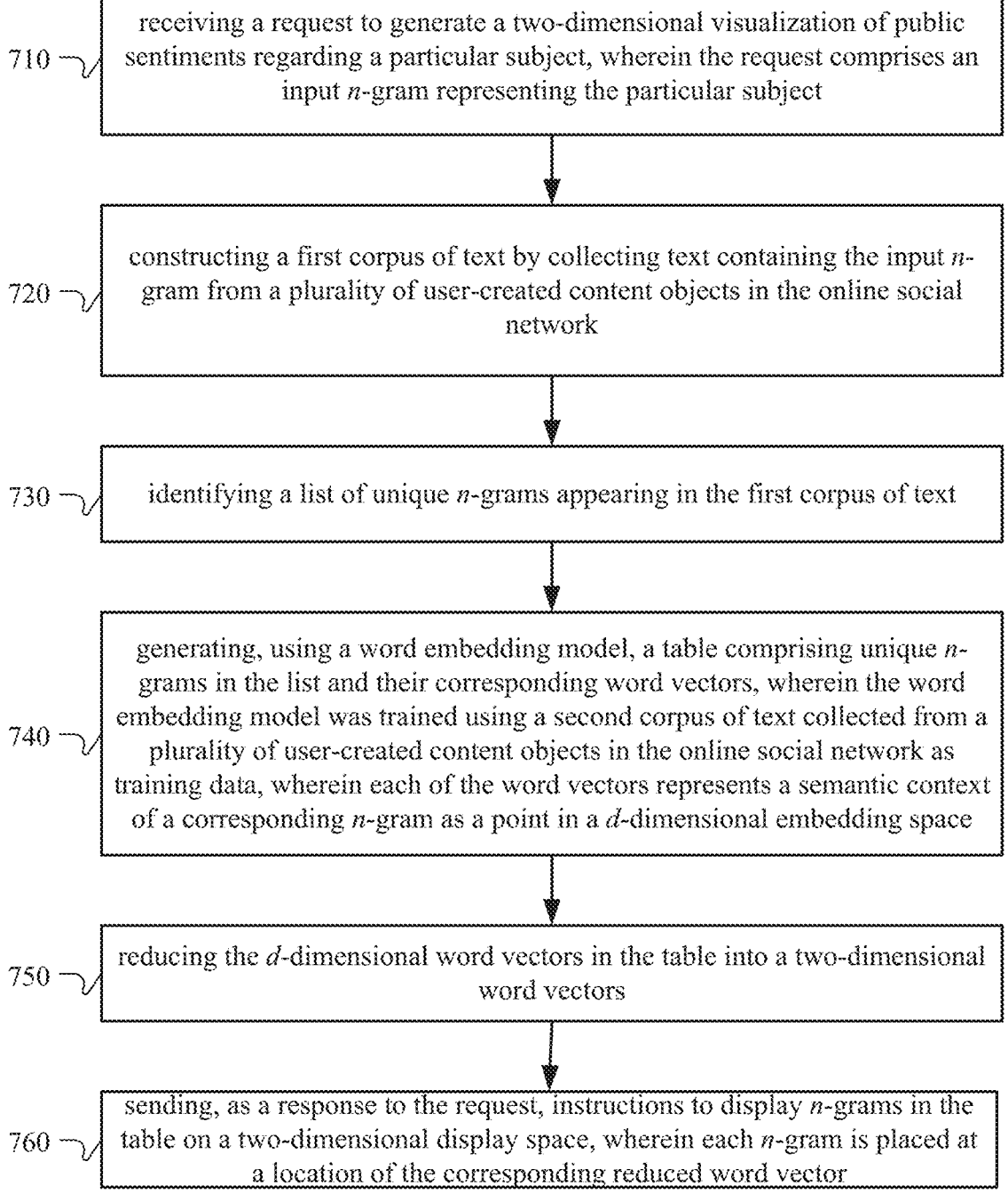
FIG. 7 illustrates an example method for visualizing public sentiments for a particular subject on a 2-dimensional space.

FIG. 7 illustrates an example method 700 for visualizing public sentiments for a particular subject on a 2-dimensional space. The method may begin at step 710, where the social-networking system 1860 may receive a request to generate a two-dimensional visualization of public sentiments regarding a particular subject, wherein the request comprises an input n-gram representing the particular subject. At step 720, the social-networking system 1860 may construct a first corpus of text by collecting text containing the input n-gram from a plurality of user-created content objects in the online social network. At step 730, the social-networking system 1860 may identify a list of unique n-grams appearing in the first corpus of text. At step 740, the social-networking system 1860 may generate, using a word embedding model, a table comprising unique n-grams in the list and their corresponding word vectors, wherein the word embedding model was trained using a second corpus of text collected from a plurality of user-created content objects in the online social network as training data, wherein each of the word vectors represents a semantic context of a corresponding n-gram as a point in a d-dimensional embedding space. At step 750, the social-networking system 1860 may condense the d-dimensional word vectors in the table into a two-dimensional word vectors. At step 760, the social-networking system 1860 may send, as a response to the request, instructions to display n-grams in the table on a two-dimensional display space, wherein each n-gram is placed at a location of the corresponding condensed word vector. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for visualizing public sentiments for a particular subject on a 2-dimensional space including the particular steps of the method of FIG. 7, this disclosure contemplates any suitable method for visualizing public sentiments for a particular subject on a 2-dimensional space including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Analogy Completion

In particular embodiments, the social-networking system 1860 may receive a request to identify a word representing a target concept that is in a first relationship with a particular concept based on that a first reference concept is in a second relationship with a second reference concept, the first relationship being analogous to the second relationship. The request may comprise a particular n-gram representing the particular concept, a first reference n-gram representing the first reference concept, and a second reference n-gram representing the second reference concept. In particular embodiments, the request may comprise one or more conditions characterizing an audience. In such a case, the social-networking system 1860 may train the word embedding model with a corpus of text collected from content objects created by a group of users who satisfy the one or more conditions. The social-networking system 1860 may access the table of word vector relationships 101. The social-networking system 1860 may look up a particular word vector corresponding to the particular n-gram, a first reference word vector corresponding to the first reference n-gram, and a second reference word vector corresponding to the second reference n-gram by looking up the particular n-gram, the first reference n-gram, and the second reference n-gram in the table 101. The social-networking system 1860 may determine a target vector such that a first directional vector from a point represented by the first reference word vector to a point represented by the second reference word vector is equal to a second directional vector from a point represented by the particular word vector to a point represented by the target vector. The first directional vector and the second directional vector are said to be equal if the vectors have the same magnitude and the same direction. The social-networking system 1860 may compute the target vector by adding the second reference vector to the particular word vector and subtracting the first reference vector from the particular word vector. The social-networking system 1860 may, for each n-gram in the table 101, calculate a similarity metric to the target vector. The social-networking system 1860 may select a target word vector closest to the target vector in the embedding space 1900 based on the calculated similarity metrics. In particular embodiments, the similarity metric is a cosine similarity. In particular embodiments, the similarity metric is a Euclidean distance. In particular embodiments, the similarity metric is a Jaccard similarity coefficient. The social-networking system 1860 may identify a target n-gram corresponding to the target word vector by looking up the target word vector in the table. The social-networking system 1860 may send a response message comprising the target n-gram. Although this disclosure describes performing an analogy completion based on word embeddings in a particular manner, this disclosure contemplates performing an analogy completion based on word embeddings in any suitable manner.

In particular embodiments, the social-networking system 1860 may receive a request to identify a word representing a target concept that is in a first relationship with a particular concept based on that a first reference concept is in a second relationship with a second reference concept, the first relationship being analogous to the second relationship. The request may comprise a particular n-gram representing the particular concept, a first reference n-gram representing the first reference concept, and a second reference n-gram representing the second reference concept. A directional relationship from a concept 'man' to a concept 'woman' is well-known. Then, the concept word that is in a relationship analogous to the directional relationship from a concept 'king' would be 'queen.' Two directional vectors are said to be equal if the vectors have the same magnitude and the same direction. The social-networking system 1860 may identify a first directional vector from a point represented by a word vector corresponding to 'man' to another point represented by a word vector corresponding to 'woman' in the embedding space 1900. If the social-networking system 1860 can identify a destination point of a directional vector from a point represented by a word vector corresponding to 'king' that makes the directional vector equal to the first directional vector, a vector representing the destination point may correspond to 'queen.' In particular embodiments, the request may comprise one or more conditions characterizing an audience. In such a case, the social-networking system 1860 may train the word embedding model with a corpus of text collected from content objects created by a group of users who satisfy the one or more conditions. As an example and not by way of limitation, a supermarket company may want to understand why people want to have a staycation. The company may already know that people travel for an adventure. Thus, the company may send a request to the social-networking system 1860 to find out a concept that is in an analogous relationship from 'staycation' to a relationship from 'travel' to 'adventure.' Although this disclosure describes receiving a request to identify a concept in a particular relationship from a particular concept in a particular manner, this disclosure contemplates receiving a request to identify a concept in a particular relationship from a particular concept in any suitable manner.

Figure 8:
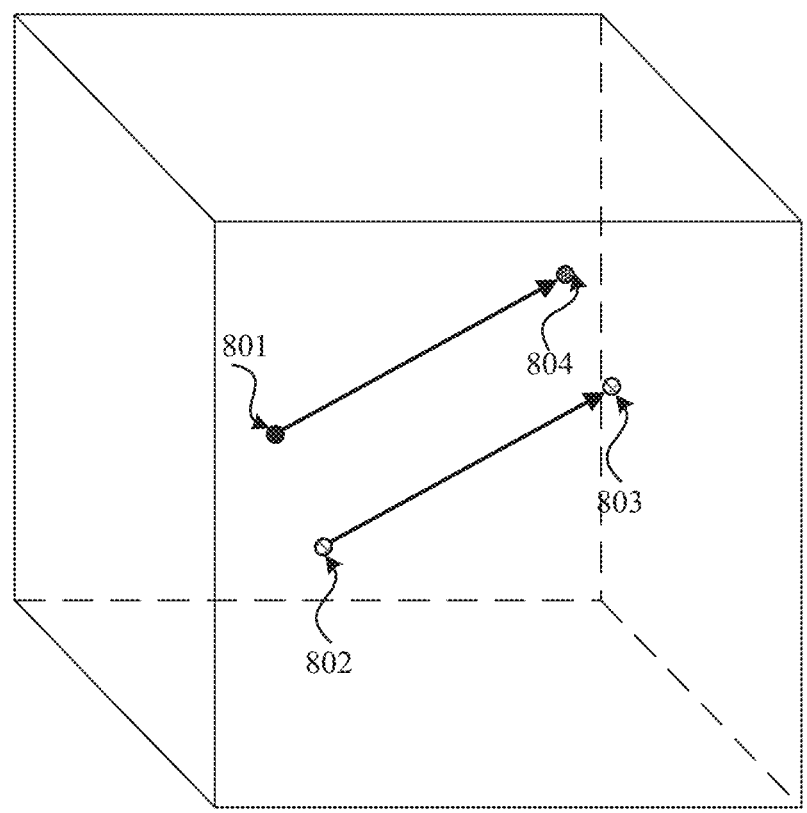
FIG. 8 illustrates an example of an analogy completion in the embedding space.

FIG. 8 illustrates an example of an analogy completion in the embedding space. In particular embodiments, the social-networking system 1860 may access a table of word vector relationships 101. The social-networking system 1860 may look up a particular word vector 801 corresponding to the particular n-gram, a first reference word vector 802 corresponding to the first reference n-gram, and a second reference word vector 803 corresponding to the second reference n-gram by looking up the particular n-gram, the first reference n-gram, and the second reference n-gram in the table 101. The social-networking system 1860 may determine an target vector 804 such that a first directional vector from a point represented by the first reference word vector 802 to a point represented by the second reference word vector 803 is equal to a second directional vector from a point represented by the particular word vector 801 to a point represented by the target vector 804. The first directional vector and the second directional vector are said to be equal if the vectors have the same magnitude and the same direction. The social-networking system 1860 may compute the target vector 804 by adding the second reference vector 803 to the particular word vector 801 and subtracting the first reference vector 802 from the particular word vector 801. Although this disclosure describes identifying an target vector for an analogy completion in a particular manner, this disclosure contemplates identifying an target vector for an analogy completion in any suitable manner.

The table 101 may not have an exactly corresponding n-gram for the target vector. Thus, the social-networking system 1860 may need to find an n-gram approximating the target concept. In particular embodiments, the social-networking system 1860 may, for each n-gram in the table 101, calculate a similarity metric to the target vector. The social-networking system 1860 may select a target word vector closest to the target vector in the embedding space 1900 based on the calculated similarity metrics. In particular embodiments, the similarity metric is a cosine similarity. In particular embodiments, the similarity metric is a Euclidean distance. In particular embodiments, the similarity metric is a Jaccard similarity coefficient. The social-networking system 1860 may identify a target n-gram corresponding to the target word vector by looking up the target word vector in the table. In particular embodiments, the social-networking system 1860 may select k word vectors closest to the target vector. The social-networking system 1860 may identify target n-grams corresponding to the selected k word vectors by looking up the selected k word vectors in the table. As an example and not by way of limitation, continuing with the prior example, the social-networking system 1860 may identify 'impromptu,' 'excursion,' 'oasis,' and 'luau' as four n-grams closest to the target concept that is in an analogous relationship from 'staycation' to a relationship from 'travel' to 'adventure.' Although this disclosure describes identifying an n-gram approximating the target concept in an analogy completion in a particular manner, this disclosure contemplates identifying an n-gram approximating the target concept in an analogy completion in any suitable manner.

The social-networking system 1860 may send a response message comprising the target n-gram. As an example and not by way of limitation, continuing with the prior example, the social-networking system 1860 may send a response with 'impromptu,' 'excursion,' 'oasis,' and 'luau' as four n-grams closest to the target concept that is in an analogous relationship from 'staycation' to a relationship from 'travel' to 'adventure.' Based on the n-grams approximating the target concept that is in an analogous relationship from 'staycation' to a relationship from 'travel' to 'adventure,' the supermarket company may send out an ad that "have a staycation on this mothers-day in an impromptu intimate way." The super market may also send out an ad that "here are things you can buy for a luau." Although this disclosure describes sending a response message comprising the target n-gram in a particular manner, this disclosure contemplates sending a response message comprising the target n-gram in any suitable manner.

Figure 9:
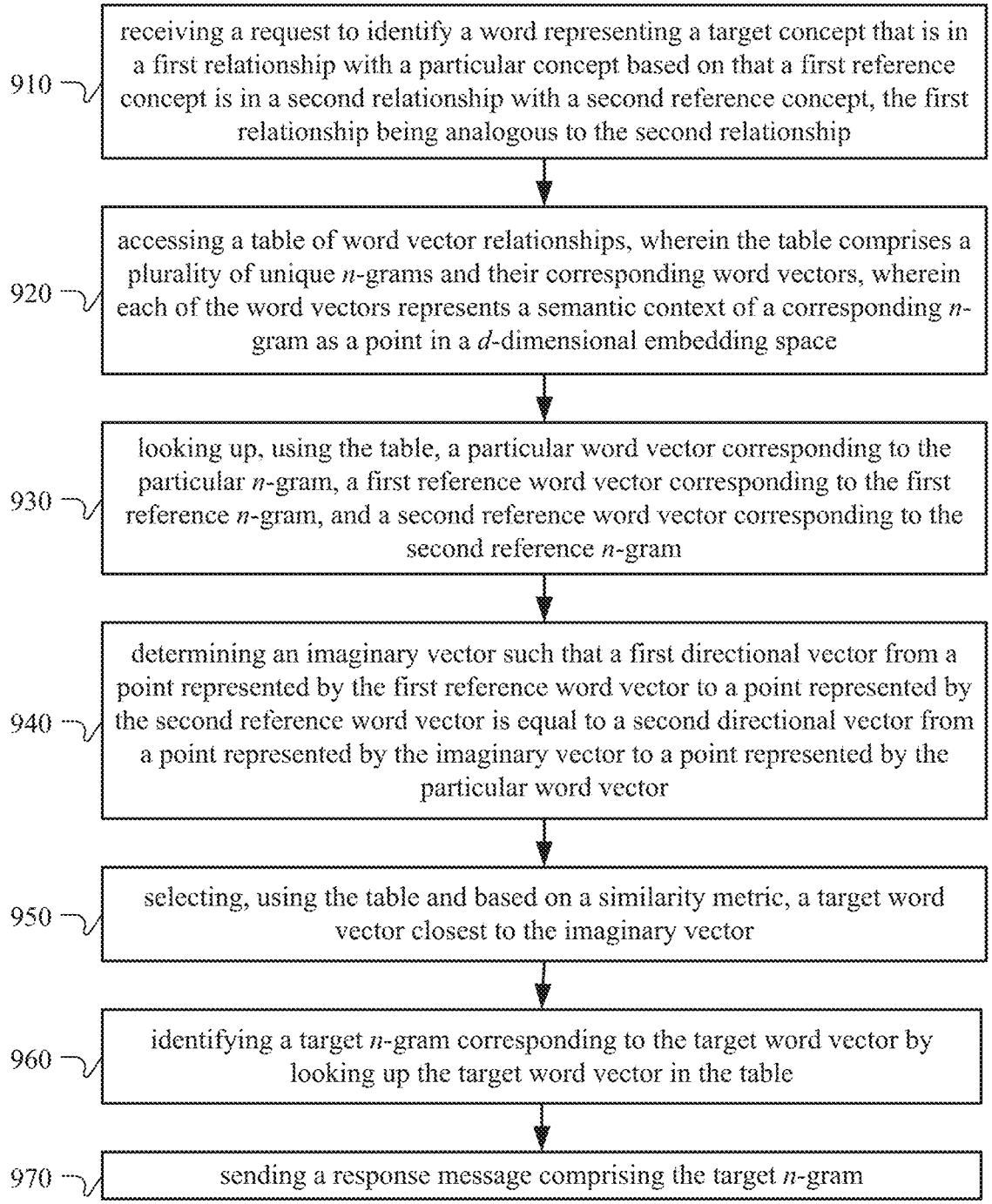
FIG. 9 illustrates an example method for performing an analogy completion based on word embeddings on receiving a request.

FIG. 9 illustrates an example method 900 for performing an analogy completion based on word embeddings on receiving a request. The method may begin at step 910, where the social-networking system 1860 may receive a request to identify a word representing a target concept that is in a first relationship with a particular concept based on that a first reference concept is in a second relationship with a second reference concept, the first relationship being analogous to the second relationship, wherein the request comprises a particular n-gram representing the particular concept, a first reference n-gram representing the first reference concept, and a second reference n-gram representing the second reference concept. At step 920, the social-networking system 1860 may access a table of word vector relationships, wherein the table comprises a plurality of unique n-grams and their corresponding word vectors, wherein each of the word vectors represents a semantic context of a corresponding n-gram as a point in a d-dimensional embedding space. At step 930, the social-networking system 1860 may look up, using the table, a particular word vector corresponding to the particular n-gram, a first reference word vector corresponding to the first reference n-gram, and a second reference word vector corresponding to the second reference n-gram. At step 940, the social-networking system 1860 may determine an target vector such that a first directional vector from a point represented by the first reference word vector to a point represented by the second reference word vector is equal to a second directional vector from a point represented by the target vector to a point represented by the particular word vector, wherein the first directional vector and the second directional vector are equal if the vectors have the same magnitude and the same direction. At step 950, the social-networking system 1860 may select, using the table and based on a similarity metric, a target word vector closest to the target vector. At step 960, the social-networking system 1860 may identify a target n-gram corresponding to the target word vector by looking up the target word vector in the table. At step 970, the social-networking system 1860 may send a response message comprising the target n-gram. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for performing an analogy completion based on word embeddings on receiving a request including the particular steps of the method of FIG. 9, this disclosure contemplates any suitable method for performing an analogy completion based on word embeddings on receiving a request including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Semantic Clustering

In particular embodiments, the social-networking system 1860 may receive a request to generate a visualization of public sentiments regarding a particular subject by a plurality of clusters. Each cluster may comprise a plurality of words semantically close to each other. The request may comprise an input n-gram representing the particular subject. In particular embodiments, the request may comprise one or more conditions characterizing an audience. In such a case, the social-networking system 1860 may train the word embedding model with a corpus of text collected from content objects created by a group of users who satisfy the one or more conditions. The social-networking system 1860 may construct a first corpus of text by collecting text containing the input n-gram from a plurality of user-created content objects in the online social network. In case the request comprises one or more conditions characterizing an audience, the social-networking system 1860 may construct the first corpus of text by collecting text containing the input n-gram from a plurality of content-objects in the online social network created by users that satisfy the one or more conditions. The social-networking system 1860 may identify a list of unique n-grams appearing in the first corpus of text. The social-networking system 1860 may generate a first table comprising unique n-grams in the list and their corresponding word vectors using a word embedding model. The social-networking system 1860 may classify word vectors in the table into a plurality of clusters based on semantic similarities of the word vectors by performing a hierarchical clustering on the word vectors in the first table. The social-networking system 1860 may determine a Term Frequency-Inverse Document Frequency (TF-IDF) score for each n-gram in the first table. The social-networking system 1860 may send instructions to display n-grams in the table on a two-dimensional display space. The instructions may include instructions to display n-grams corresponding to word vectors that belong to a same cluster together. In particular embodiments, the instructions may include instructions to adjust a font size for an n-gram based at least on a respective TF-IDF score assigned to the n-gram. In particular embodiments, the instructions may include instructions to assign a font color for n-grams in a semantic cluster. If the social-networking system 1860 determines that the number of clusters exceeds a threshold, the instructions may include instructions to display the most relevant k clusters to the particular subject. In particular embodiments, the social-networking system 1860 may identify the most relevant k clusters to the particular subject by calculating an average TD-IDF score for the cluster by taking an average of determined TD-IDF scores for n-grams corresponding to word vectors that belong to the cluster for each cluster in the plurality of clusters, and selecting k clusters with highest average TD-IDF scores from the plurality of clusters. In particular embodiments, the social-networking system 1860 may identify the most relevant k clusters to the particular subject by determining a maximum TD-IDF score for the cluster by comparing determined TD-IDF scores for n-grams corresponding to word vectors that belong to the cluster for each cluster in the plurality of clusters, and selecting k clusters with highest maximum TD-IDF scores from the plurality of clusters. Although this disclosure describes visualizing public sentiments regarding a particular subject in a particular manner, this disclosure contemplates visualizing public sentiments regarding a particular subject in any suitable manner.

In particular embodiments, the social-networking system 1860 may receive a request to generate a visualization of public sentiments regarding a particular subject by a plurality of clusters. The online social network may have a large corpus of text collected from content objects generated by users. Because the number of users generating the content objects may be large and the users may be well distributed in terms of demographics, the corpus of text may represent contemporary public sentiments. A third-party user may want to understand public sentiments around a particular subject. A clustered visualization of keywords representing public sentiments may be an intuitive tool for the third-party user to understand public sentiments. The third-party user may send the request to the social-networking system 1860 to generate a clustered visualization of keywords representing public sentiments regarding the particular subject. Each cluster may comprise a plurality of words semantically close to each other. The request may comprise an input n-gram representing the particular subject. In particular embodiments, the request may comprise one or more conditions characterizing an audience. In such a case, the social-networking system 1860 may train the word embedding model with a corpus of text collected from content objects created by a group of users who satisfy the one or more conditions. As an example and not by way of limitation, a third-party user may be studying public insights about 'pregnancy.' The third-party user may want to see keywords representing public sentiments regarding 'pregnancy' in a clustered way, where each cluster includes keywords semantically close to each other. The third-party user may send a request to the social-networking system 1860 to generate a clustered visualization of keywords representing public sentiments regarding 'pregnancy.' Although this disclosure describes receiving a request to generate a clustered visualization of keywords related to a particular subject in a particular manner, this disclosure contemplates receiving a request to generate a clustered visualization of keywords related to a particular subject in any suitable manner.

In particular embodiments, the social-networking system 1860 may construct a first corpus of text by collecting text containing the input n-gram from a plurality of user-created content objects in the online social network. In case the request comprises one or more conditions characterizing an audience, the social-networking system 1860 may construct the first corpus of text by collecting text containing the input n-gram from a plurality of content-objects in the online social network created by users that satisfy the one or more conditions. The social-networking system 1860 may identify a list of unique n-grams appearing in the first corpus of text. The social-networking system 1860 may generate a first table comprising unique n-grams in the list and their corresponding word vectors using a word embedding model. The social-networking system 1860 may classify word vectors in the first table into a plurality of clusters based on semantic similarities of the word vectors by performing a hierarchical clustering on the word vectors in the first table. Hierarchical clustering is a method of cluster analysis that seeks to build a hierarchy of clusters. Two alternative approaches may be available for hierarchical clustering: In an agglomerative approach, each word vectors may start in its own cluster. Pairs of clusters may be merged. In a divisive approach, all the word vectors may start in one cluster. Splitting the cluster may be performed recursively. To decide which clusters should be combined, or where a cluster should be split, a measure of dissimilarity between sets of word vectors is required. A similarity metric may be used for the decision. The social-networking system 1860 may classify word vectors in the first table into a plurality of clusters based on semantic similarities of the word vectors by performing any other suitable algorithms. The social-networking system 1860 may determine a Term Frequency-Inverse Document Frequency (TF-IDF) score for each n-gram in the first table. TF-IDF is a way to score the importance of n-grams in a document based on how frequently the n-grams appear across multiple documents. If an n-gram appears frequently in a document, the n-gram may be an important one. The social-networking system 1860 may assign a high score to the n-gram. However, some n-grams (e.g., the, is, a, that) may appear frequently in many documents. The social-networking system 1860 may lower the score for those n-grams as those n-grams are not unique. Although this disclosure describes classifying word vectors into clusters in a particular manner, this disclosure contemplates classifying word vectors into clusters in any suitable manner.

Figure 10:
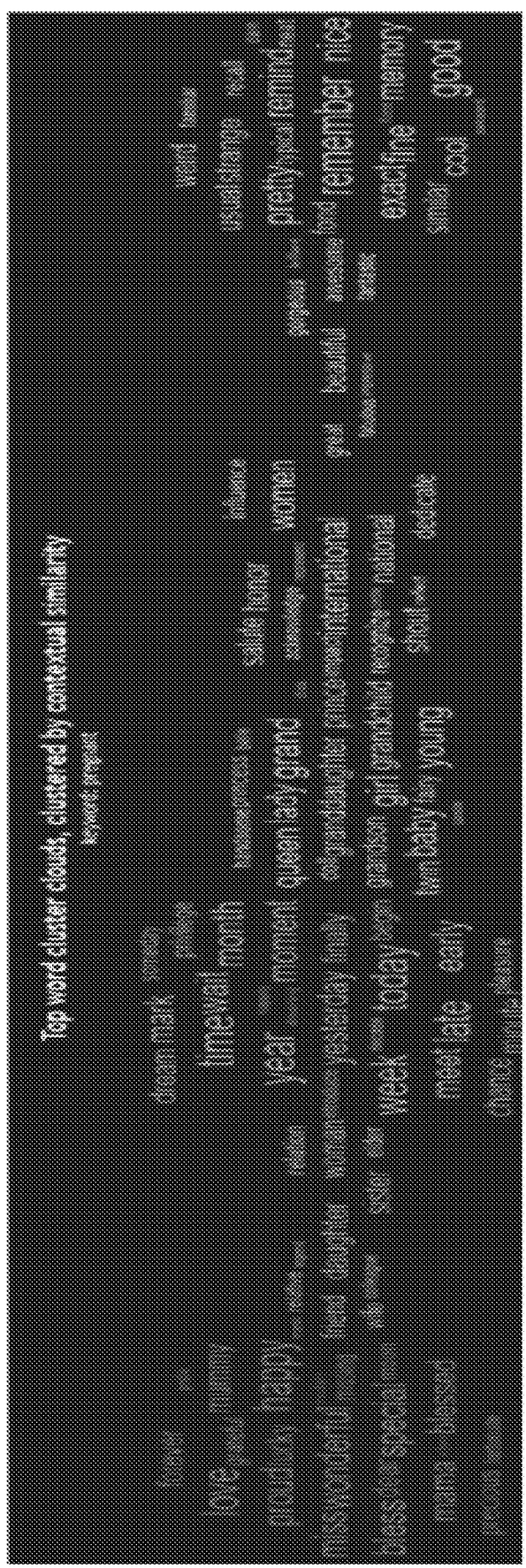
FIG. 10 illustrates an example visualization of public sentiments for a particular subject in a plurality of clusters.

In particular embodiments, the social-networking system 1860 may send instructions to display n-grams in the first table in a two-dimensional display space. The instructions may include instructions to display n-grams corresponding to word vectors that belong to a same cluster together. In particular embodiments, the instructions may include instructions to adjust a font size for an n-gram based at least on a respective TF-IDF score assigned to the n-gram. In particular embodiments, the instructions may include instructions to assign a font color for n-grams in a semantic cluster. If the social-networking system 1860 determines that a number of clusters exceeds a threshold, the instructions may include instructions to display the most relevant k clusters to the particular subject. In particular embodiments, the social-networking system 1860 may identify the most relevant k clusters to the particular subject by calculating an average TD-IDF score for the cluster by taking an average of determined TD-IDF scores for n-grams corresponding to word vectors that belong to the cluster for each cluster in the plurality of clusters, and selecting k clusters with highest average TD-IDF scores from the plurality of clusters. In particular embodiments, the social-networking system 1860 may identify the most relevant k clusters to the particular subject by determining a maximum TD-IDF score for the cluster by comparing determined TD-IDF scores for n-grams corresponding to word vectors that belong to the cluster for each cluster in the plurality of clusters, and selecting k clusters with highest maximum TD-IDF scores from the plurality of clusters. FIG. 10 illustrates an example visualization of public sentiments for a particular subject in a plurality of clusters. As an example and not by way of limitation, continuing with the prior example, the social-networking system 1860 may, in response to the request, send instructions to display n-grams that are closely related to 'pregnancy' in a two-dimensional display space in a clustered way, where each cluster includes n-grams that are semantically close to each other. The instructions may include instructions to display the most relevant k clusters to 'pregnancy.' The instructions may include instructions to assign a font color for a cluster. The instructions may include instructions to adjust a font size for an n-gram based on the calculated TF-IDF score for the n-gram. Although this disclosure describes displaying n-grams in a plurality of clusters in a particular manner, this disclosure contemplates displaying n-grams in a plurality of clusters in any suitable manner.

Figure 11:
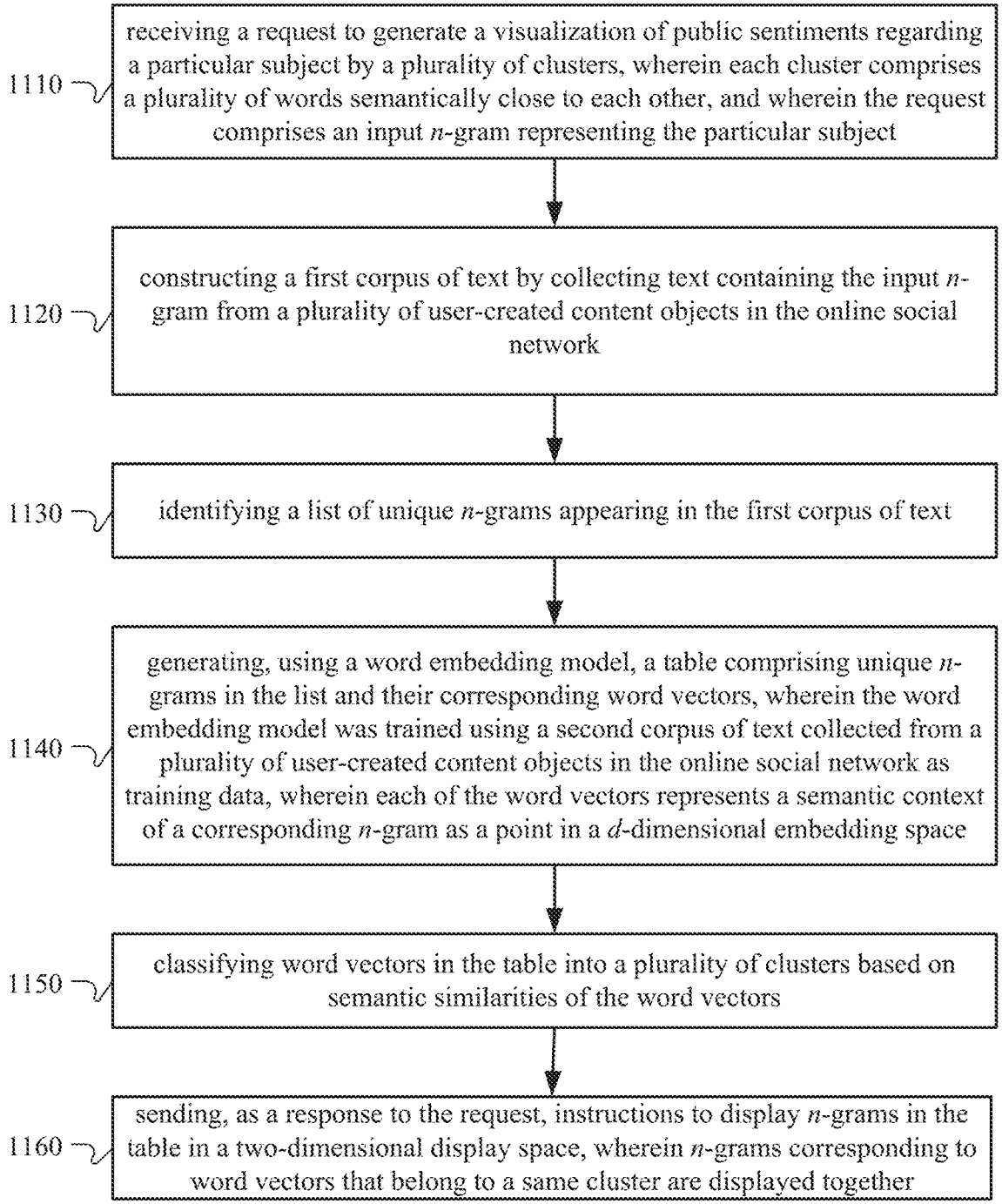
FIG. 11 illustrates an example method for visualizing public sentiments for a particular subject in a plurality of clusters.

FIG. 11 illustrates an example method 1100 for visualizing public sentiments for a particular subject in a plurality of clusters. The method may begin at step 1110, where the social-networking system 1860 may receive a request to generate a visualization of public sentiments regarding a particular subject by a plurality of clusters, wherein each cluster comprises a plurality of words semantically close to each other, and wherein the request comprises an input n-gram representing the particular subject. At step 1120, the social-networking system 1860 may construct a first corpus of text by collecting text containing the input n-gram from a plurality of user-created content objects in the online social network. At step 1130, the social-networking system 1860 may identify a list of unique n-grams appearing in the first corpus of text. At step 1140, the social-networking system 1860 may generate, using a word embedding model, a table comprising unique n-grams in the list and their corresponding word vectors, wherein the word embedding model was trained using a second corpus of text collected from a plurality of user-created content objects in the online social network as training data, wherein each of the word vectors represents a semantic context of a corresponding n-gram as a point in a d-dimensional embedding space. At step 1150, the social-networking system 1860 may classify word vectors in the table into a plurality of clusters based on semantic similarities of the word vectors. At step 1160, the social-networking system 1860 may send, as a response to the request, instructions to display n-grams in the table in a two-dimensional display space, wherein n-grams corresponding to word vectors that belong to the same cluster are displayed together. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for visualizing public sentiments for a particular subject in a plurality of clusters including the particular steps of the method of FIG. 11, this disclosure contemplates any suitable method for visualizing public sentiments for a particular subject in a plurality of clusters including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Word Paths

In particular embodiments, the social-networking system 1860 may receive a request to identify k steps for a particular entity to acquire a target attribute in public sentiments from a computing device. The request may include an entity name for the particular entity and an n-gram representing the target attribute. In particular embodiments, the request may comprise one or more conditions characterizing an audience. In such a case, the social-networking system 1860 may train the word embedding model with a corpus of text collected from content objects created by a group of users who satisfy the one or more conditions. The social-networking system 1860 may access the table of word vector relationships 101. The social-networking system 1860 may look up an entity word vector corresponding to the entity name and a target attribute word vector corresponding to the n-gram that represents the target attribute by looking up the entity name and the n-gram representing the target attribute in the table 101. The social-networking system 1860 may determine a directional vector in the d-dimensional embedding space 1900 that connects from a point represented by the entity word vector to a point represented by the target attribute word vector. The social-networking system 1860 may identify k points on the directional vector that evenly split the directional vector into k+1 segments. The social-networking system 1860 may, for each n-gram in the table 101, calculate a similarity metric to each of the identified k points. The social-networking system 1860 may select, for each of the k points, a word vector that is closest to the point in the embedding space 1900 based on the calculated similarity metrics. In particular embodiments, the similarity metric is a cosine similarity. In particular embodiments, the similarity metric is a Euclidean distance. In particular embodiments, the similarity metric is a Jaccard similarity coefficient. The social-networking system 1860 may identify a corresponding n-gram for each of the k selected word vectors by looking up the word vector in the table. The social-networking system 1860 may send a response message comprising the k identified n-grams to the computing device. Although this disclosure describes identifying k steps for an entity to achieve a particular attribute in a particular manner, this disclosure contemplates identifying k steps for an entity to achieve a particular attribute in any suitable manner.

In particular embodiments, the social-networking system 1860 may receive a request to identify k steps for a particular entity to acquire a target attribute in public sentiments from a computing device. The request may include an entity name for the particular entity and an n-gram representing the target attribute. Semantically close n-grams may be represented by word vectors close to each other in the embedding space 1900. If a first word vector corresponding to an entity name is close to a second word vector corresponding to a quality or an attribute of an entity (e.g., creative, intelligent, innovative), the entity may be perceived by public as possessing the quality represented by the second word vector. For example, if a word vector corresponding to an online social network provider is close to a word vector corresponding to 'innovative' in the embedding space 1900, the social network provider may be considered as being innovative by the public. A word embedding corresponding to a name of an entity may not be close to a desired quality or attribute. A third-party user associated with the computing device may want to identify a way for the entity to be considered having the desired attribute by the public. A number of attributes located between the entity name and the desired attribute in the embedding space 1900 may provide a hint for the entity to acquire the desired attribute. The third-party user may send a request to the social-networking system 1860 to identify k attributes located along a path from the entity to the desired attribute in the embedding space. In particular embodiments, the request may comprise one or more conditions characterizing an audience. In such a case, the social-networking system 1860 may train the word embedding model with a corpus of text collected from content objects created by a group of users who satisfy the one or more conditions. As an example and not by way of limitation, a global software company may want to increase its perception as innovative. A third-party user at the global software company may send a request to an online social network to identify k attributes located along a path from the company name to 'innovative' in the embedding space 1900. Although this disclosure describes receiving a request to identify k attributes located along a path from a particular entity to an attribute in the embedding space in a particular manner, this disclosure contemplates receiving a request to identify k attributes located along a path from a particular entity to an attribute in the embedding space in any suitable manner.

Figure 12:
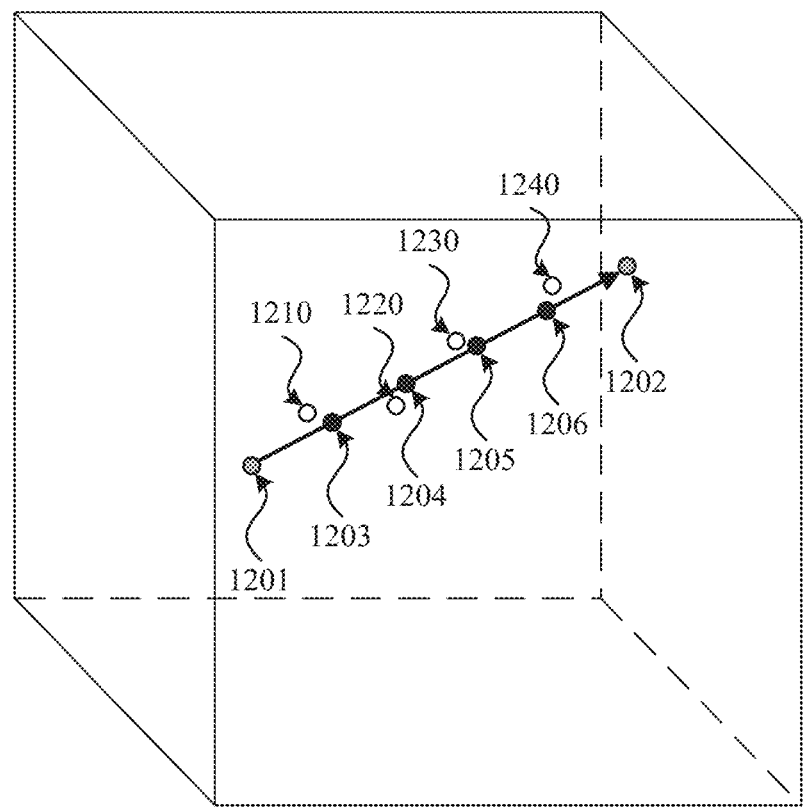
FIG. 12 illustrates an example of identifying k steps from an entity vector to a target attribute vector in the embedding space.

FIG. 12 illustrates an example of identifying k steps from an entity vector to a target attribute vector in the embedding space. In particular embodiments, the social-networking system 1860 may access the table of word vector relationships 101. The social-networking system 1860 may look up an entity word vector 1201 corresponding to the entity name and a target attribute word vector 1202 corresponding to the n-gram representing the target attribute by looking up the entity name and the n-gram representing the target attribute in the table 101. The social-networking system 1860 may determine a directional vector in the d-dimensional embedding space 1900 that connects from a point represented by the entity word vector 1201 to a point represented by the target attribute word vector 1202. The social-networking system 1860 may identify k points on the directional vector that evenly split the directional vector into k+1 segments. In the example illustrated in FIG. 12, the social-networking system 1860 may have identified four points 1203, 1204, 1205, and 1206 on the directional vector. The social-networking system 1860 may, for each n-gram in the table 101, calculate a similarity metric to each of the identified k points. The social-networking system 1860 may select, for each of the k points, a word vector that is closest to the point in the embedding space 1900 based on the calculated similarity metrics. In the example illustrated in FIG. 12, the social-networking system 1860 may have selected four word vectors 1210, 1220, 1230, and 1240 that are closest to points 1202, 1203, 1204, and 1205, respectively. In particular embodiments, the similarity metric is a cosine similarity. In particular embodiments, the similarity metric is a Euclidean distance. In particular embodiments, the similarity metric is a Jaccard similarity coefficient. The social-networking system 1860 may identify a corresponding n-gram for each of the k selected word vectors by looking up the word vector in the table. Although this disclosure describes identifying k n-grams along the path from the entity name to the desired attribute in the embedding space in a particular manner, this disclosure contemplates identifying k n-grams along the path from the entity name to the desired attribute in the embedding space in any suitable manner.

The social-networking system 1860 may send a response message comprising the k identified n-grams to the computing device. As an example and not by way of limitation, continuing with the prior example, the social-networking system 1860 may send a message including 'software,' 'funding,' 'proposal,' 'industry,' development,' 'nation,' 'education,' and 'fund' in an order of distance from the company name. Based on the identified n-grams on the path, the third-party user may determine that the global software company may need to focus on international development and educational funding rather than trying to keep software innovator position in order to increase public perception on the company as innovative. Although this disclosure describes sending a response including k identified n-grams in a particular manner, this disclosure contemplates sending a response including k identified n-grams in any suitable manner.

Figure 13:
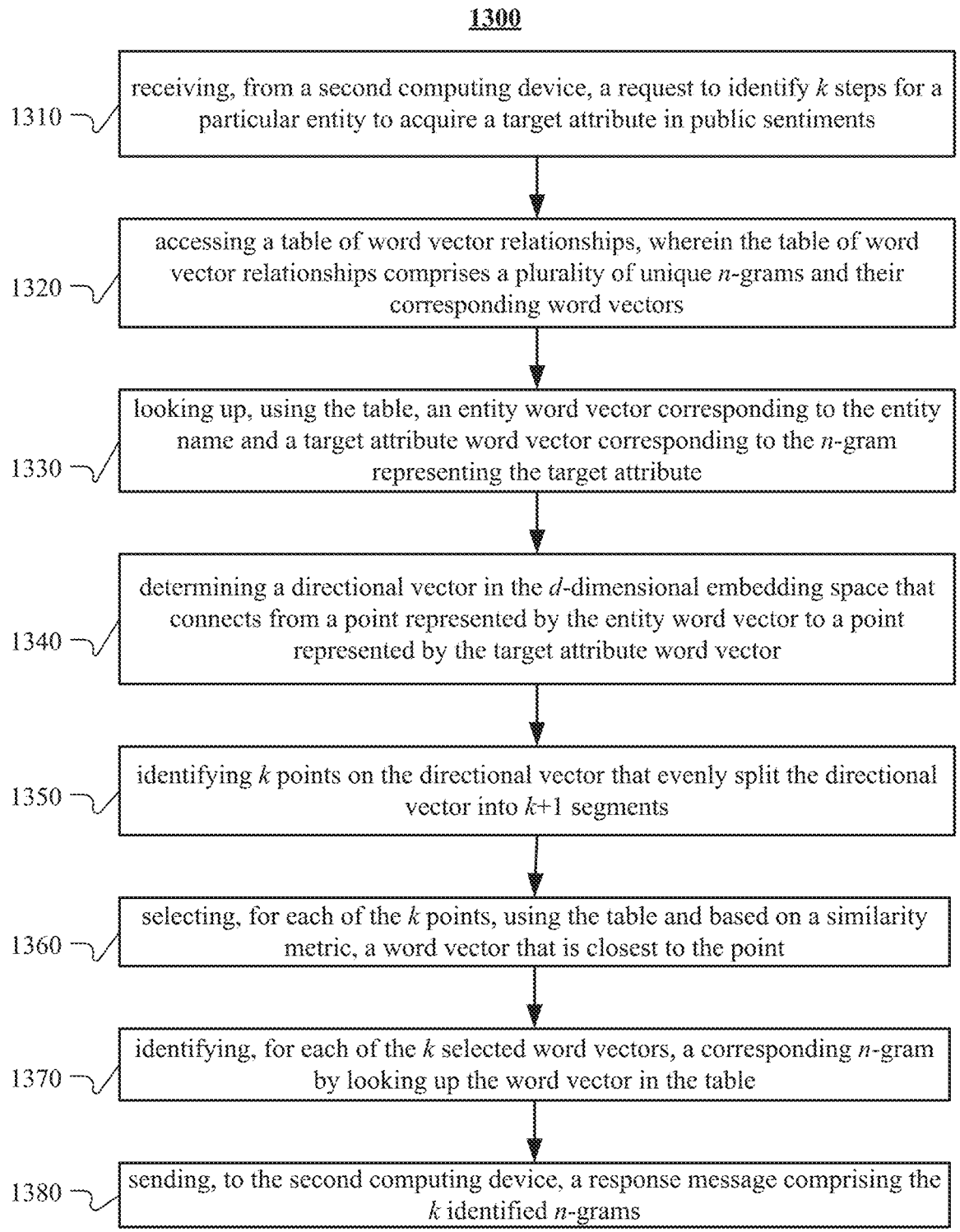
FIG. 13 illustrates an example method for identifying k steps for a particular entity to acquire a target attribute on receiving a request.

FIG. 13 illustrates an example method 1300 for identifying k steps for a particular entity to acquire a target attribute on receiving a request. The method may begin at step 1310, where the social-networking system 1860 may receive, from a second computing device, a request to identify k steps for a particular entity to acquire a target attribute in public sentiments, wherein the request comprises an entity name for the particular entity and an n-gram representing the target attribute. At step 1320, the social-networking system 1860 may access a table of word vector relationships, wherein the table of word vector relationships comprises a plurality of unique n-grams and their corresponding word vectors, wherein each of the word vectors represents a semantic context of a corresponding n-gram as a point in a d-dimensional embedding space. At step 1330, the social-networking system 1860 may look up, using the table, an entity word vector corresponding to the entity name and a target attribute word vector corresponding to the n-gram representing the target attribute. At step 1340, the social-networking system 1860 may determine a directional vector in the d-dimensional embedding space that connects from a point represented by the entity word vector to a point represented by the target attribute word vector. At step 1350, the social-networking system 1860 may identify k points on the directional vector that evenly split the directional vector into k+1 segments. At step 1360, the social-networking system 1860 may select, for each of the k points, using the table and based on a similarity metric, a word vector that is closest to the point. At step 1370, the social-networking system 1860 may identify, for each of the k selected word vectors, a corresponding n-gram by looking up the word vector in the table. At step 1380, the social-networking system 1860 may send, to the second computing device, a response message comprising the k identified n-grams. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for identifying k steps for a particular entity to acquire a target attribute on receiving a request including the particular steps of the method of FIG. 13, this disclosure contemplates any suitable method for identifying k steps for a particular entity to acquire a target attribute on receiving a request including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Brand Attribute Mapping

In particular embodiments, the social-networking system 1860 may receive a request to identify public sentiments for one or more entities from a computing device. The request may include names of the one or more entities and a plurality of attribute n-grams representing a plurality of pre-determined attributes. In particular embodiments, the request may comprise one or more conditions characterizing an audience.

In such a case, the social-networking system 1860 may train the word embedding model with a corpus of text collected from content objects created by a group of users who satisfy the one or more conditions. The social-networking system 1860 may access a table of word vector relationships. The social-networking system 1860 may look up entity word vectors corresponding to each of the names of the one or more entities and attribute word vectors corresponding to each of the plurality of attribute n-grams by looking up each of the names of the one or more entities and each of the plurality of attribute n-grams in the table. For each of the entity word vectors, the social-networking system 1860 may calculate a similarity metric to each of the attribute word vectors in the embedding space 1900. In particular embodiments, the similarity metric is a cosine similarity. In particular embodiments, the similarity metric is a Euclidean distance. In particular embodiments, the similarity metric is a Jaccard similarity coefficient. The social-networking system 1860 may send a response message to the computing device. The response message may include calculated similarity metrics corresponding to all the pairs of an entity word vector and an attribute word vector. In particular embodiments, the response message may include instructions to display the calculated similarity metrics. The calculated similarity metrics may be color-coded where a color may represent any number within a pre-determined range. Although this disclosure describes identifying public sentiments for one or more entities in a particular manner, this disclosure contemplates identifying public sentiments for one or more entities in any suitable manner.

In particular embodiments, the social-networking system 1860 may receive a request to identify public sentiments for one or more entities from a computing device. The request may include names of the one or more entities and a plurality of attribute n-grams representing a plurality of pre-determined attributes. Semantically close n-grams may be represented by word vectors close to each other in the embedding space 1900. If a first word vector corresponding to an entity name is close to a second word vector corresponding to a quality or an attribute (e.g., creative, intelligent, innovative) of an entity, the entity may be perceived by the public as possessing the quality corresponding to the second word vector. The first word vector corresponding to the entity name may not be close to a third word vector corresponding to another attribute. In such a case, the entity may not be perceived by the public as possessing the attribute corresponding to the third word vector. A third-party user associated with the computing device may want to evaluate public perceptions for one or more entities. The third-party user may send a request to identify public perceptions for one or more entities. The request may include names of one or more entities and attribute n-grams representing a plurality of pre-determined attributes. In particular embodiments, the request may comprise one or more conditions characterizing an audience. In such a case, the social-networking system 1860 may train the word embedding model with a corpus of text collected from content objects created by a group of users who satisfy the one or more conditions. As an example and not by way of limitation, a third-party use may want to evaluate public perceptions for a plurality of companies including 1420, 1430, 1440, 1450, 1460, 1470, and 1480. The third-party user may prepare a plurality of pre-determined attributes for the companies including 'necessary' 1401, 'intelligent' 1402, 'important' 1403, 'helpful' 1404, 'fun' 1405, 'delicious' 1406, 'creative' 1407, 'confident' 1408, 'cheap' 1409, 'beautiful' 1410, and 'authentic' 1411. The third-party user may send a request to the social-networking system 1860 to identify closeness between the companies and the attributes in public sentiments. Although this disclosure describes receiving a request to identify closeness between entities and attributes in a particular manner, this disclosure contemplates receiving a request to identify closeness between entities and attributes in any suitable manner.

In particular embodiments, the social-networking system 1860 may access a table of word vector relationships. The social-networking system 1860 may look up entity word vectors corresponding to each of the names of the one or more entities and attribute word vectors corresponding to each of the plurality of attribute n-grams by looking up each of the names of the one or more entities and each of the plurality of attribute n-grams in the table. For each of the entity word vectors, the social-networking system 1860 may calculate a similarity metric to each of the attribute word vectors in the embedding space 1900. In particular embodiments, the similarity metric is a cosine similarity. In particular embodiments, the similarity metric is a Euclidean distance. In particular embodiments, the similarity metric is a Jaccard similarity coefficient. Although this disclosure describes calculating a similarity metric of each of the entity word vectors to each of the attribute word vectors in a particular manner, this disclosure contemplates calculating a similarity metric of each of the entity word vectors to each of the attribute word vectors in any suitable manner.

Figure 14:
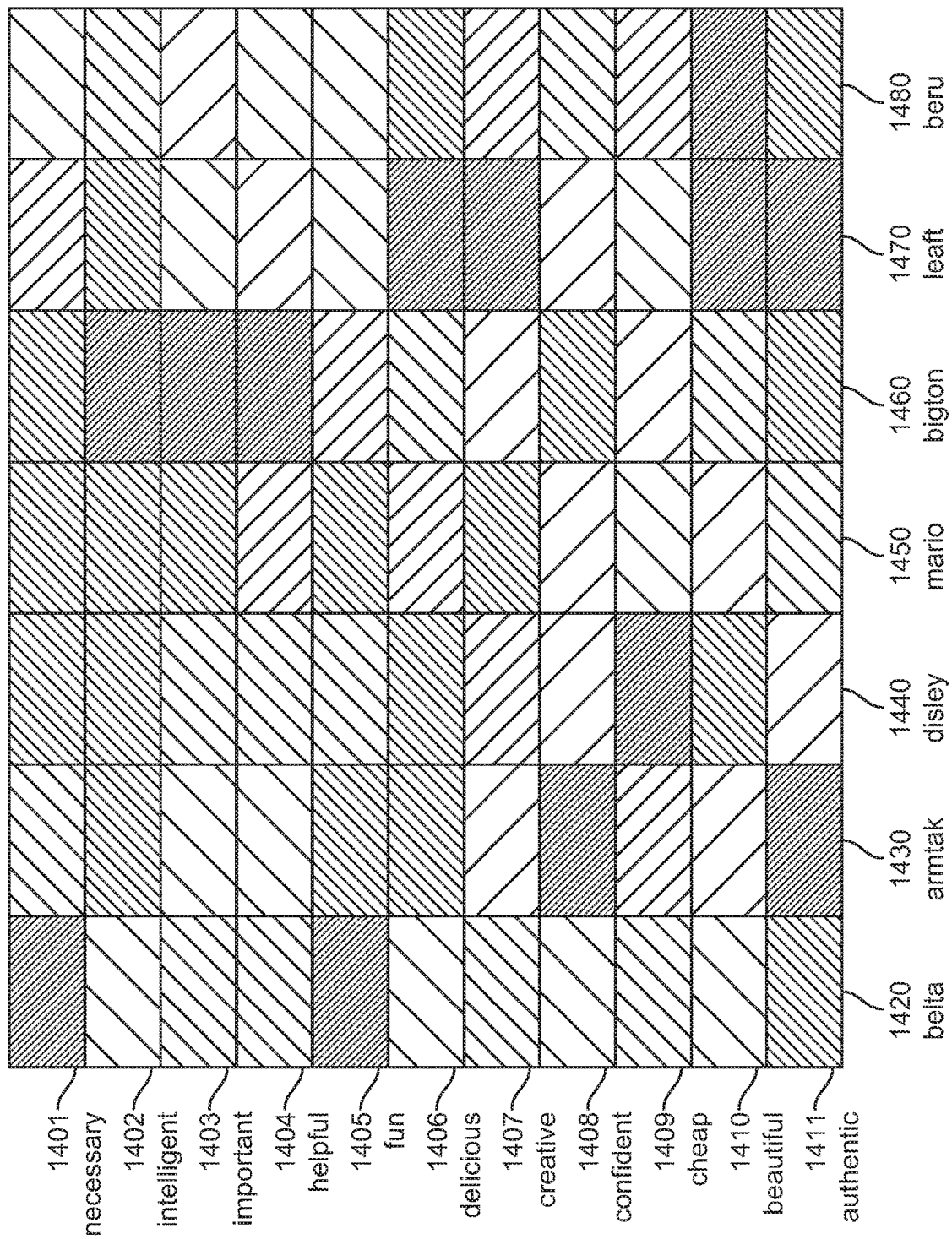
FIG. 14 illustrates an example similarity metrics between entities and attributes.

In particular embodiments, the social-networking system 1860 may send a response message to the computing device. The response message may include calculated similarity metrics corresponding to all the pairs of an entity word vector and an attribute word vector. In particular embodiments, the response message may include instructions to display the calculated similarity metrics. The calculated similarity metrics may be color-coded where a color may represent any number within a pre-determined range. The calculated similarity metrics may be pattern-coded where a pattern may represent any number within a pre-determined range. The calculated similarity metrics may be color-pattern-coded where a combination of a color and a pattern may represent any number within a pre-determined range. FIG. 14 illustrates an example similarity metrics between entities and attributes. In the example illustrated in FIG. 14, the similarity metrics are color-pattern-coded. As an example and not by way of limitation, continuing with the prior example, the social-networking system 1860 may calculate a similarity metric for each of the companies (1420, 1430, 1440, 1450, 1460, 1470, and 1480) to each of the pre-determined attributes ('necessary' 1401, 'intelligent' 1402, 'important' 1403, 'helpful' 1404, 'fun' 1405, 'delicious' 1406, 'creative' 1407, 'confident' 1408, 'cheap' 1409, 'beautiful' 1410, and 'authentic' 1411). The social-networking system 1860 may send a response message including similarity metrics corresponding to all the pairs of an entity word vector and an attribute word vector. The response message may include instructions to display the calculated similarity metrics in color-pattern-codes. Although this disclosure describes displaying similarity metrics corresponding to all the pairs of an entity and an attribute in a particular manner, this disclosure contemplates similarity metrics corresponding to all the pairs of an entity and an attribute in any suitable manner.

FIG. 15 illustrates an example method 1500 for identifying public sentiments for one or more entities on receiving a request. The method may begin at step 1510, where the social-networking system 1860 may receive, from a second computing device, a request to identify public sentiments for one or more entities, wherein the request comprises names of the one or more entities and a plurality of attribute n-grams, wherein each of the attribute n-grams represents an attribute among a plurality of pre-determined attributes. At step 1520, the social-networking system 1860 may access a table of word vector relationships, wherein the table of word vector relationships comprises a plurality of unique n-grams and their corresponding word vectors, wherein each of the word vectors represents a semantic context of a corresponding n-gram as a point in a d-dimensional embedding space. At step 1530, the social-networking system 1860 may look up, using the table, entity word vectors corresponding to each of the names for the one or more entities and attribute word vectors corresponding to each of the plurality of attribute n-grams. At step 1540, the social-networking system 1860 may calculate, for each of the entity word vectors, a similarity metric to each of the attribute word vectors. At step 1550, the social-networking system 1860 may send, to the second computing device, a response message, wherein the response message comprises calculated similarity metrics corresponding to all the pairs of an entity word vector and an attribute word vector. Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates an example method for identifying public sentiments for one or more entities on receiving a request including the particular steps of the method of FIG. 15, this disclosure contemplates any suitable method for identifying public sentiments for one or more entities on receiving a request including any suitable steps, which may include all, some, or none of the steps of the method of FIG. 15, where appropriate. Furthermore, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

Brand Perception Overlap

In particular embodiments, the social-networking system 1860 may receive a request to identify a similarity in public sentiments for each pair from a plurality of entities from a second computing device. The request may include names of the plurality of entities. In particular embodiments, the request may comprise one or more conditions characterizing an audience. In such a case, the social-networking system 1860 may train the word embedding model with a corpus of text collected from content objects created by a group of users who satisfy the one or more conditions. The social-networking system 1860 may access a table of word vector relationships. The social-networking system 1860 may look up word vectors corresponding to each of the names by looking up each of the names. For each of the word vectors, the social-networking system 1860 may calculate a similarity metric to each of the word vectors in the embedding space 1900. In particular embodiments, the similarity metric is a cosine similarity. In particular embodiments, the similarity metric is a Euclidean distance. In particular embodiments, the similarity metric is a Jaccard similarity coefficient. The social-networking system 1860 may send a response message to the computing device. The response message may include calculated similarity metrics corresponding to all the pairs of the word vectors. In particular embodiments, the response message may include instructions to display the calculated similarity metrics. The calculated similarity metrics may be color-coded where a color may represent any number within a pre-determined range. Although this disclosure describes identifying a similarity in public sentiments for each pair from a plurality of entities in a particular manner, this disclosure contemplates identifying a similarity in public sentiments for each pair from a plurality of entities in any suitable manner.

In particular embodiments, the social-networking system 1860 may receive a request to identify a similarity in public sentiments for each pair from a plurality of entities from a second computing device. The request may include names of the plurality of entities. Semantically close n-grams may be represented by word vectors close to each other in the embedding space 1900. If word vectors corresponding to two entity names are close to each other in the embedding space 1900, the two entities may be viewed similarly by the public. Two entities whose corresponding word vectors are far from each other in the embedding space 1900 may be viewed differently by the public. A third-party user associated with the computing device may want to understand how close a number of entities are perceived by the public to each other. The third-party user may send a request to the social-networking system 1860 to identify similarity metrics between entities. The request may include a list of entity names. In particular embodiments, the request may comprise one or more conditions characterizing an audience. In such a case, the social-networking system 1860 may train the word embedding model with a corpus of text collected from content objects created by a group of users who satisfy the one or more conditions. As an example and not by way of limitation, a third-party user may want to understand how close a list of beer brands are perceived by consumers. The third-party user may send a request to the social-networking system 1860 to calculate similarity metrics for each pair of beer brands in the embedding space 1900. The request may include a list of beer brands: 1601, 1602, 1603, 1604, 1605, and 1606. Although this disclosure describes receiving a request to calculate similarity metrics between entities in the embedding space 1900 in a particular manner, this disclosure contemplates receiving a request to calculate similarity metrics between entities in the embedding space 1900 in any suitable manner.

In particular embodiments, the social-networking system 1860 may access a table of word vector relationships. The social-networking system 1860 may look up word vectors corresponding to each of the names by looking up each of the names. For each of the word vectors, the social-networking system 1860 may calculate a similarity metric to each of the word vectors in the embedding space 1900. In particular embodiments, the similarity metric is a cosine similarity. In particular embodiments, the similarity metric is a Euclidean distance. In particular embodiments, the similarity metric is a Jaccard similarity coefficient. Although this disclosure describes calculating a similarity metric for each pair of word vectors in a particular manner, this disclosure contemplates calculating a similarity metric for each pair of word vectors in any suitable manner.

In particular embodiments, the social-networking system 1860 may send a response message to the computing device. The response message may include calculated similarity metrics corresponding to all the pairs of the word vectors. In particular embodiments, the response message may include instructions to display the calculated similarity metrics. The calculated similarity metrics may be color-coded where a color may represent any number within a pre-determined range. The calculated similarity metrics may be pattern-coded where a pattern may represent any number within a pre-determined range. The calculated similarity metrics may be color-pattern-coded where a combination of a color and a pattern may represent any number within a pre-determined range. FIG. 16 illustrates an example similarity metrics for each pair of entities. As an example and not by way of limitation, continuing with the prior example, the social-networking system 1860 may calculate similarity metrics for all the pairs of word vectors corresponding to the beer brands: (1601, 1602, 1603, 1604, 1605, and 1606). The social-networking system 1860 may send a response message including the calculated similarity metrics. The response may include instructions to display the calculated similarity metrics. Although this disclosure describes displaying similarity metrics in a particular manner, this disclosure contemplates displaying similarity metrics in any suitable manner.

FIG. 17 illustrates an example method 1700 for identifying a similarity in public sentiments for each pair from a plurality of entities. The method may begin at step 1710, where the social-networking system 1860 may receive, from a second computing device, a request to identify a similarity in public sentiments for each pair from a plurality of entities, wherein the request comprises names of the plurality of entities. At step 1720, the social-networking system 1860 may access a table of word vector relationships, wherein the table of word vector relationships comprises a plurality of unique n-grams and their corresponding word vectors, wherein each of the word vectors represents a semantic context of a corresponding n-gram as a point in a d-dimensional embedding space. At step 1730, the social-networking system 1860 may look up, using the table, word vectors corresponding to each of the names. At step 1740, the social-networking system 1860 may calculate, for each of the word vectors, a similarity metric to each of the word vectors. At step 1750, the social-networking system 1860 may send, to the second computing device, a response message, wherein the response message comprises calculated similarity metrics corresponding to all the pairs of the word vectors. Particular embodiments may repeat one or more steps of the method of FIG. 17, where appropriate. Although this disclosure describes and illustrates particular steps of the method of FIG. 17 as occurring in a particular order, this disclosure contemplates any suitable steps of the method of FIG. 17 occurring in any suitable order. Moreover, although this disclosure describes and illustrates an example method for identifying a similarity in public sentiments for each pair from a plurality of entities including the particular steps of the method of FIG. 17, this disclosure contemplates any suitable method for identifying a similarity in public sentiments for each pair from a plurality of entities including any suitable steps, which may include all, some, or none of the steps of the method of FIG. 17, where appropriate. Furthermore, although this disclosure describes and illustrates particular components, devices, or systems carrying out particular steps of the method of FIG. 17, this disclosure contemplates any suitable combination of any suitable components, devices, or systems carrying out any suitable steps of the method of FIG. 17.

System Overview

Figure 18:
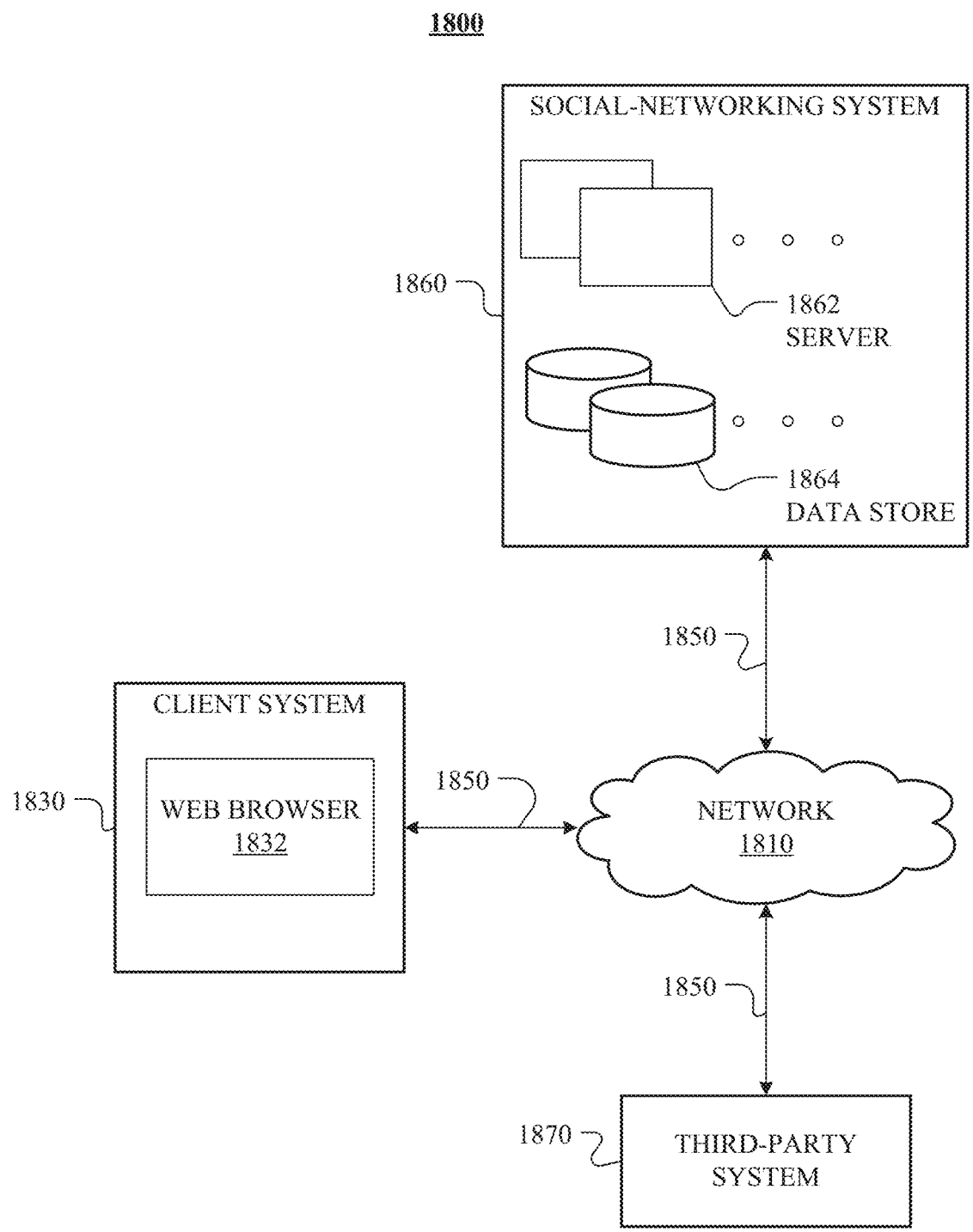
FIG. 18 illustrates an example network environment associated with a social-networking system.

FIG. 18 illustrates an example network environment 1800 associated with a social-networking system. Network environment 1800 includes a client system 1830, a social-networking system 1860, and a third-party system 1870 connected to each other by a network 1810. Although FIG. 18 illustrates a particular arrangement of client system 1830, social-networking system 1860, third-party system 1870, and network 1810, this disclosure contemplates any suitable arrangement of client system 1830, social-networking system 1860, third-party system 1870, and network 1810. As an example and not by way of limitation, two or more of client system 1830, social-networking system 1860, and third-party system 1870 may be connected to each other directly, bypassing network 1810. As another example, two or more of client system 1830, social-networking system 1860, and third-party system 1870 may be physically or logically co-located with each other in whole or in part. Moreover, although FIG. 18 illustrates a particular number of client systems 1830, social-networking systems 1860, third-party systems 1870, and networks 1810, this disclosure contemplates any suitable number of client systems 1830, social-networking systems 1860, third-party systems 1870, and networks 1810. As an example and not by way of limitation, network environment 1800 may include multiple client system 1830, social-networking systems 1860, third-party systems 1870, and networks 1810.

This disclosure contemplates any suitable network 1810. As an example and not by way of limitation, one or more portions of network 1810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1810 may include one or more networks 1810.

Links 1850 may connect client system 1830, social-networking system 1860, and third-party system 1870 to communication network 1810 or to each other. This disclosure contemplates any suitable links 1850. In particular embodiments, one or more links 1850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1850, or a combination of two or more such links 1850. Links 1850 need not necessarily be the same throughout network environment 1800. One or more first links 1850 may differ in one or more respects from one or more second links 1850.

In particular embodiments, client system 1830 may be an electronic device including hardware, software, or embedded logic components or a combination of two or more such components and capable of carrying out the appropriate functionalities implemented or supported by client system 1830. As an example and not by way of limitation, a client system 1830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1830. A client system 1830 may enable a network user at client system 1830 to access network 1810.

A client system 1830 may enable its user to communicate with other users at other client systems 1830.

In particular embodiments, client system 1830 may include a web browser 1832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1830 may enter a Uniform Resource Locator (URL) or other address directing the web browser 1832 to a particular server (such as server 1862, or a server associated with a third-party system 1870), and the web browser 1832 may generate a Hyper Text Transfer Protocol (HTTP) request and communicate the HTTP request to server. The server may accept the HTTP request and communicate to client system 1830 one or more Hyper Text Markup Language (HTML) files responsive to the HTTP request. Client system 1830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1860 may be a network-addressable computing system that can host an online social network. Social-networking system 1860 may generate, store, receive, and send social-networking data, such as, for example, user-profile data, concept-profile data, social-graph information, or other suitable data related to the online social network. Social-networking system 1860 may be accessed by the other components of network environment 1800 either directly or via network 1810. As an example and not by way of limitation, client system 1830 may access social-networking system 1860 using a web browser 1832, or a native application associated with social-networking system 1860 (e.g., a mobile social-networking application, a messaging application, another suitable application, or any combination thereof) either directly or via network 1810. In particular embodiments, social-networking system 1860 may include one or more servers 1862. Each server 1862 may be a unitary server or a distributed server spanning multiple computers or multiple datacenters. Servers 1862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1862 may include hardware, software, or embedded logic components or a combination of two or more such components for carrying out the appropriate functionalities implemented or supported by server 1862. In particular embodiments, social-networking system 1860 may include one or more data stores 1864. Data stores 1864 may be used to store various types of information. In particular embodiments, the information stored in data stores 1864 may be organized according to specific data structures. In particular embodiments, each data store 1864 may be a relational, columnar, correlation, or other suitable database. Although this disclosure describes or illustrates particular types of databases, this disclosure contemplates any suitable types of databases. Particular embodiments may provide interfaces that enable a client system 1830, a social-networking system 1860, or a third-party system 1870 to manage, retrieve, modify, add, or delete, the information stored in data store 1864.

In particular embodiments, social-networking system 1860 may store one or more social graphs in one or more data stores 1864. In particular embodiments, a social graph may include multiple nodes—which may include multiple user nodes (each corresponding to a particular user) or multiple concept nodes (each corresponding to a particular concept)—and multiple edges connecting the nodes. Social-networking system 1860 may provide users of the online social network the ability to communicate and interact with other users. In particular embodiments, users may join the online social network via social-networking system 1860 and then add connections (e.g., relationships) to a number of other users of social-networking system 1860 to whom they want to be connected. Herein, the term "friend" may refer to any other user of social-networking system 1860 with whom a user has formed a connection, association, or relationship via social-networking system 1860.

In particular embodiments, social-networking system 1860 may provide users with the ability to take actions on various types of items or objects, supported by social-networking system 1860. As an example and not by way of limitation, the items and objects may include groups or social networks to which users of social-networking system 1860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1860 or by an external system of third-party system 1870, which is separate from social-networking system 1860 and coupled to social-networking system 1860 via a network 1810.

In particular embodiments, social-networking system 1860 may be capable of linking a variety of entities. As an example and not by way of limitation, social-networking system 1860 may enable users to interact with each other as well as receive content from third-party systems 1870 or other entities, or to allow users to interact with these entities through an application programming interfaces (API) or other communication channels.

In particular embodiments, a third-party system 1870 may include one or more types of servers, one or more data stores, one or more interfaces, including but not limited to APIs, one or more web services, one or more content sources, one or more networks, or any other suitable components, e.g., that servers may communicate with. A third-party system 1870 may be operated by a different entity from an entity operating social-networking system 1860. In particular embodiments, however, social-networking system 1860 and third-party systems 1870 may operate in conjunction with each other to provide social-networking services to users of social-networking system 1860 or third-party systems 1870. In this sense, social-networking system 1860 may provide a platform, or backbone, which other systems, such as third-party systems 1870, may use to provide social-networking services and functionality to users across the Internet.

In particular embodiments, a third-party system 1870 may include a third-party content object provider. A third-party content object provider may include one or more sources of content objects, which may be communicated to a client system 1830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1860 also includes user-generated content objects, which may enhance a user's interactions with social-networking system 1860. User-generated content may include anything a user can add, upload, send, or "post" to social-networking system 1860. As an example and not by way of limitation, a user communicates posts to social-networking system 1860 from a client system 1830. Posts may include data such as status updates or other textual data, location information, photos, videos, links, music or other similar data or media. Content may also be added to social-networking system 1860 by a third-party through a "communication channel," such as a newsfeed or stream.

In particular embodiments, social-networking system 1860 may include a variety of servers, sub-systems, programs, modules, logs, and data stores. In particular embodiments, social-networking system 1860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1860 may also include suitable components such as network interfaces, security mechanisms, load balancers, failover servers, management-and-network-operations consoles, other suitable components, or any suitable combination thereof. In particular embodiments, social-networking system 1860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1860 to one or more client systems 1830 or one or more third-party system 1870 via network 1810. The web server may include a mail server or other messaging functionality for receiving and routing messages between social-networking system 1860 and one or more client systems 1830. An API-request server may allow a third-party system 1870 to access information from social-networking system 1860 by calling one or more APIs.

An action logger may be used to receive communications from a web server about a user's actions on or off social-networking system 1860. In conjunction with the action log, a third-party-content-object log may be maintained of user exposures to third-party-content objects. A notification controller may provide information regarding content objects to a client system 1830. Information may be pushed to a client system 1830 as notifications, or information may be pulled from client system 1830 responsive to a request received from client system 1830. Authorization servers may be used to enforce one or more privacy settings of the users of social-networking system 1860. A privacy setting of a user determines how particular information associated with a user can be shared. The authorization server may allow users to opt in to or opt out of having their actions logged by social-networking system 1860 or shared with other systems (e.g., third-party system 1870), such as, for example, by setting appropriate privacy settings. Third-party-content-object stores may be used to store content objects received from third parties, such as a third-party system 1870. Location stores may be used for storing location information received from client systems 1830 associated with users. Advertisement-pricing modules may combine social information, the current time, location information, or other suitable information to provide relevant advertisements, in the form of notifications, to a user.

Vector Spaces and Embeddings

Figure 19:
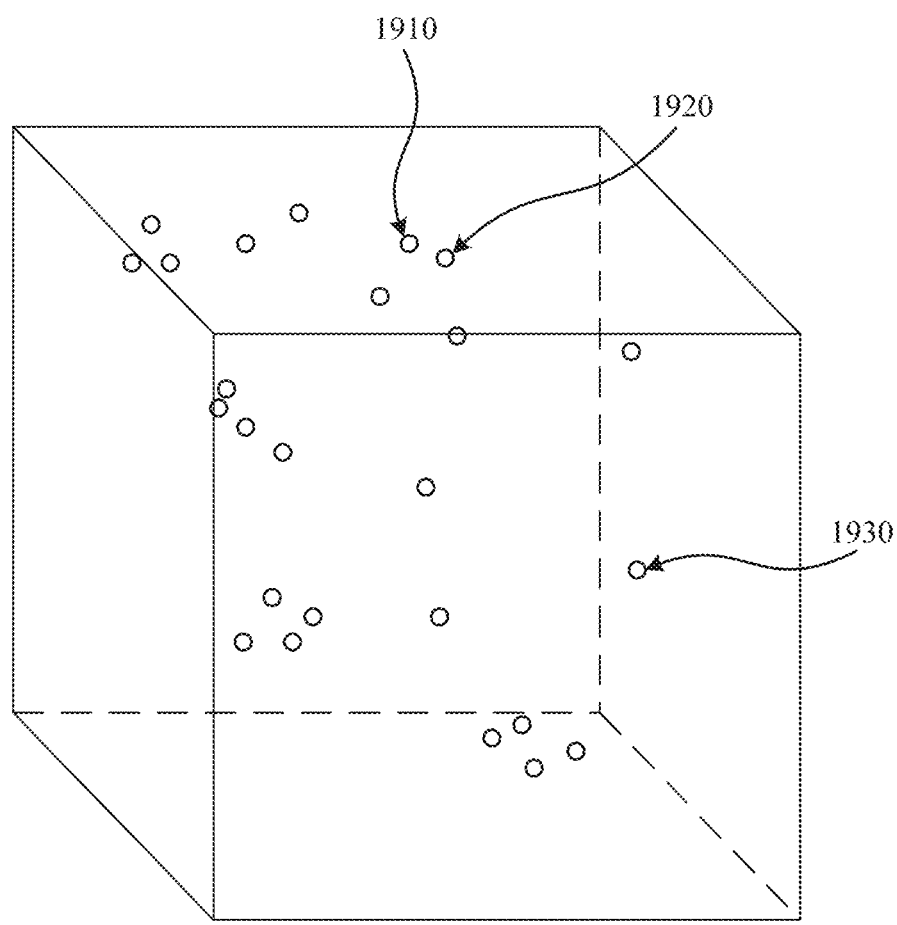
FIG. 19 illustrates an example view of a vector space 1900.

FIG. 19 illustrates an example view of a vector space 1900. In particular embodiments, an object or an n-gram may be represented in a d-dimensional vector space, where d denotes any suitable number of dimensions. Although the vector space 1900 is illustrated as a three-dimensional space, this is for illustrative purposes only, as the vector space 1900 may be of any suitable dimension. In particular embodiments, an n-gram may be represented in the vector space 1900 as a vector referred to as a term embedding. Each vector may comprise coordinates corresponding to a particular point in the vector space 1900 (i.e., the terminal point of the vector). As an example and not by way of limitation, vectors 1910, 1920, and 1930 may be represented as points in the vector space 1900, as illustrated in FIG. 19. An n-gram may be mapped to a respective vector representation. As an example and not by way of limitation, n-grams $t_1$ and $t_2$ may be mapped to vectors $\vec{v_1}$ and $\vec{v_2}$ in the vector space 1900, respectively, by applying a function $\vec{\pi}$ defined by a dictionary, such that $\vec{v_1}=\vec{\pi}(t_1)$ and $\vec{v_2}=\vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 1900. In particular embodiments, an n-gram may be mapped to a vector representation in the vector space 1900 by using a machine leaning model (e.g., a neural network). The machine learning model may have been trained using a sequence of training data (e.g., a corpus of objects each comprising n-grams).

In particular embodiments, an object may be represented in the vector space 1900 as a vector referred to as a feature vector or an object embedding. As an example and not by way of limitation, objects $e_1$ and $e_2$ may be mapped to vectors $\vec{v_1}$ and $\vec{v_2}$ in the vector space 1900, respectively, by applying a function $\vec{\pi}$, such that $\vec{v_1}=\vec{\pi}(e_1)$ and $\vec{v_2}=\vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}$ (e) based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 1860 may calculate a similarity metric of vectors in vector space 1900. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 1900. As an example and not by way of limitation, vector 1910 and vector 1920 may correspond to objects that are more similar to one another than the objects corresponding to vector 1910 and vector 1930, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Systems and Methods

Figure 20:
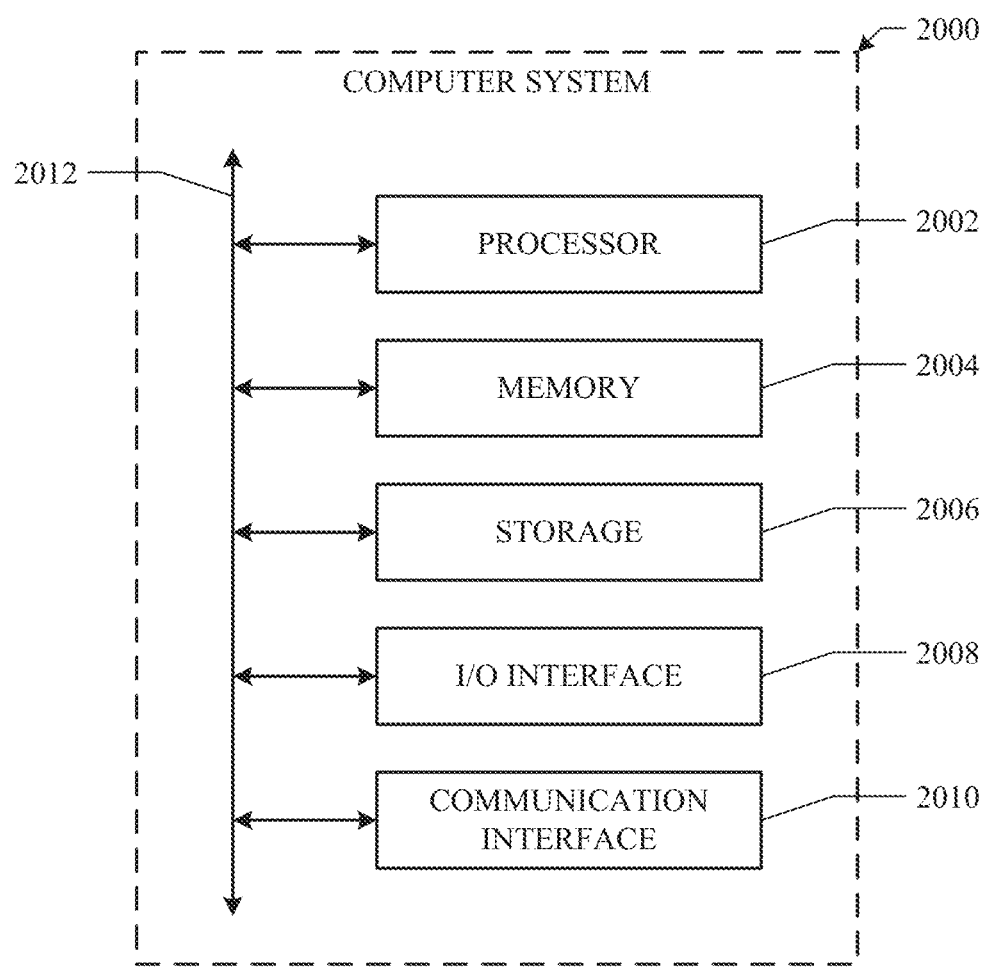
FIG. 20 illustrates an example computer system.

FIG. 20 illustrates an example computer system 2000. In particular embodiments, one or more computer systems 2000 perform one or more steps of one or more methods described or illustrated herein. In particular embodiments, one or more computer systems 2000 provide functionality described or illustrated herein. In particular embodiments, software running on one or more computer systems 2000 performs one or more steps of one or more methods described or illustrated herein or provides functionality described or illustrated herein. Particular embodiments include one or more portions of one or more computer systems 2000. Herein, reference to a computer system may encompass a computing device, and vice versa, where appropriate. Moreover, reference to a computer system may encompass one or more computer systems, where appropriate.

This disclosure contemplates any suitable number of computer systems 2000. This disclosure contemplates computer system 2000 taking any suitable physical form. As example and not by way of limitation, computer system 2000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2000 may include one or more computer systems 2000; be unitary or distributed; span multiple locations; span multiple machines; span multiple data centers; or reside in a cloud, which may include one or more cloud components in one or more networks. Where appropriate, one or more computer systems 2000 may perform without substantial spatial or temporal limitation one or more steps of one or more methods described or illustrated herein. As an example and not by way of limitation, one or more computer systems 2000 may perform in real time or in batch mode one or more steps of one or more methods described or illustrated herein. One or more computer systems 2000 may perform at different times or at different locations one or more steps of one or more methods described or illustrated herein, where appropriate.

In particular embodiments, computer system 2000 includes a processor 2002, memory 2004, storage 2006, an input/output (I/O) interface 2008, a communication interface 2010, and a bus 2012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2002 includes hardware for executing instructions, such as those making up a computer program. As an example and not by way of limitation, to execute instructions, processor 2002 may retrieve (or fetch) the instructions from an internal register, an internal cache, memory 2004, or storage 2006; decode and execute them; and then write one or more results to an internal register, an internal cache, memory 2004, or storage 2006. In particular embodiments, processor 2002 may include one or more internal caches for data, instructions, or addresses. This disclosure contemplates processor 2002 including any suitable number of any suitable internal caches, where appropriate. As an example and not by way of limitation, processor 2002 may include one or more instruction caches, one or more data caches, and one or more translation lookaside buffers (TLBs). Instructions in the instruction caches may be copies of instructions in memory 2004 or storage 2006, and the instruction caches may speed up retrieval of those instructions by processor 2002. Data in the data caches may be copies of data in memory 2004 or storage 2006 for instructions executing at processor 2002 to operate on; the results of previous instructions executed at processor 2002 for access by subsequent instructions executing at processor 2002 or for writing to memory 2004 or storage 2006; or other suitable data. The data caches may speed up read or write operations by processor 2002. The TLBs may speed up virtual-address translation for processor 2002. In particular embodiments, processor 2002 may include one or more internal registers for data, instructions, or addresses. This disclosure contemplates processor 2002 including any suitable number of any suitable internal registers, where appropriate. Where appropriate, processor 2002 may include one or more arithmetic logic units (ALUs); be a multi-core processor; or include one or more processors 2002. Although this disclosure describes and illustrates a particular processor, this disclosure contemplates any suitable processor.

In particular embodiments, memory 2004 includes main memory for storing instructions for processor 2002 to execute or data for processor 2002 to operate on. As an example and not by way of limitation, computer system 2000 may load instructions from storage 2006 or another source (such as, for example, another computer system 2000) to memory 2004. Processor 2002 may then load the instructions from memory 2004 to an internal register or internal cache. To execute the instructions, processor 2002 may retrieve the instructions from the internal register or internal cache and decode them. During or after execution of the instructions, processor 2002 may write one or more results (which may be intermediate or final results) to the internal register or internal cache. Processor 2002 may then write one or more of those results to memory 2004. In particular embodiments, processor 2002 executes only instructions in one or more internal registers or internal caches or in memory 2004 (as opposed to storage 2006 or elsewhere) and operates only on data in one or more internal registers or internal caches or in memory 2004 (as opposed to storage 2006 or elsewhere). One or more memory buses (which may each include an address bus and a data bus) may couple processor 2002 to memory 2004. Bus 2012 may include one or more memory buses, as described below. In particular embodiments, one or more memory management units (MMUs) reside between processor 2002 and memory 2004 and facilitate accesses to memory 2004 requested by processor 2002. In particular embodiments, memory 2004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2004 may include one or more memories 2004, where appropriate. Although this disclosure describes and illustrates particular memory, this disclosure contemplates any suitable memory.

[99] In particular embodiments, storage 2006 includes mass storage for data or instructions. As an example and not by way of limitation, storage 2006 may include a hard disk drive (HDD), a floppy disk drive, flash memory, an optical disc, a magneto-optical disc, magnetic tape, or a Universal Serial Bus (USB) drive or a combination of two or more of these. Storage 2006 may include removable or non-removable (or fixed) media, where appropriate. Storage 2006 may be internal or external to computer system 2000, where appropriate. In particular embodiments, storage 2006 is non-volatile, solid-state memory. In particular embodiments, storage 2006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2006 taking any suitable physical form. Storage 2006 may include one or more storage control units facilitating communication between processor 2002 and storage 2006, where appropriate. Where appropriate, storage 2006 may include one or more storages 2006. Although this disclosure describes and illustrates particular storage, this disclosure contemplates any suitable storage.

In particular embodiments, I/O interface 2008 includes hardware, software, or both, providing one or more interfaces for communication between computer system 2000 and one or more I/O devices. Computer system 2000 may include one or more of these I/O devices, where appropriate. One or more of these I/O devices may enable communication between a person and computer system 2000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2008 for them. Where appropriate, I/O interface 2008 may include one or more device or software drivers enabling processor 2002 to drive one or more of these I/O devices. I/O interface 2008 may include one or more I/O interfaces 2008, where appropriate. Although this disclosure describes and illustrates a particular I/O interface, this disclosure contemplates any suitable I/O interface.

In particular embodiments, communication interface 2010 includes hardware, software, or both providing one or more interfaces for communication (such as, for example, packet-based communication) between computer system 2000 and one or more other computer systems 2000 or one or more networks. As an example and not by way of limitation, communication interface 2010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2010 for it. As an example and not by way of limitation, computer system 2000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2000 may include any suitable communication interface 2010 for any of these networks, where appropriate. Communication interface 2010 may include one or more communication interfaces 2010, where appropriate. Although this disclosure describes and illustrates a particular communication interface, this disclosure contemplates any suitable communication interface.

In particular embodiments, bus 2012 includes hardware, software, or both coupling components of computer system 2000 to each other. As an example and not by way of limitation, bus 2012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2012 may include one or more buses 2012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a first computing device in an online social network, receiving, from a second computing device, a request to generate k words that each approximates a representation of a relationship between two concepts, wherein the request comprises two input n-grams that each represents one of the two concepts, and wherein the request comprises one or more conditions characterizing an audience;
    by the first computing device, identifying users of the online social network who satisfy the one or more conditions;
    by the first computing device, constructing a corpus of text by collecting text content from content objects created by the identified users;
    by the first computing device, constructing a table of word vector relationships by training a word embedding mode using the constructed corpus of text as training data, wherein the table of word vector relationships comprises a plurality of unique n-grams and their corresponding word vectors, wherein each of the word vectors represents a semantic context of a corresponding n-gram as a point in a d-dimensional embedding space;
    by the first computing device, looking up, using the table, word vectors corresponding to each of the two input n-grams;
    by the first computing device, calculating an average vector by taking a weighted average of the word vectors corresponding to the two input n-grams;
    by the first computing device, selecting, using the table and based on a similarity metric, k word vectors closest to the average vector in the embedding space;
    by the first computing device, identifying, for each of the selected word vectors, a corresponding n-gram by looking up the selected word vector in the table; and
    by the first computing device, sending, to the second computing device, a response message, the response message comprising the identified n-grams.

2. The method of claim 1, wherein the plurality of unique n-grams in the table are selected from the constructed corpus of text.

3. The method of claim 1, wherein the word embedding model is a word2vec model.

4. The method of claim 1, wherein the looking up a word vector corresponding to each of the two input n-grams comprises looking up the n-gram in the table.

5. The method of claim 1, wherein a weight assigned to each of the two word vectors corresponding to the two input n-grams is an Inverse Document Frequency (IDF) score for the corresponding n-gram.

6. The method of claim 5, wherein the IDF score for an n-gram is a measure reflecting specificity of the n-gram, wherein the IDF score is based on a number of documents containing the n-gram in a corpus of text.

7. The method of claim 1, wherein the similarity metric is a cosine similarity.

8. The method of claim 1, wherein the similarity metric is a Euclidean distance.

9. The method of claim 1, wherein the similarity metric is a Jaccard similarity coefficient.

10. The method of claim 1, wherein each of the two concepts respectively represents a projected target audience.

11. The method of claim 1, wherein the constructing the table of word vector relationships comprises:
identifying a list of unique n-grams appearing in the corpus of text;
training a word embedding model using the corpus of text, wherein the word embedding model generates word vectors corresponding to the unique n-grams; and
generating, using the word embedding model, the table based on the list of unique n-grams and their corresponding word vectors.

12. The method of claim 1, wherein the content objects were created within a pre-determined period of time.

13. One or more computer-readable non-transitory storage media embodying software that is operable when executed to:
receive, from a second computing device, a request to generate k words that each approximates a representation of a relationship between two concepts, wherein the request comprises two input n-grams that each represents one of the two concepts, and wherein the request comprises one or more conditions characterizing an audience;
by the first computing device, identifying users of the online social network who satisfy the one or more conditions;
by the first computing device, constructing a corpus of text by collecting text content from content objects created by the identified users;
construct a table of word vector relationships by training a word embedding mode using the constructed corpus of text as training data, wherein the table of word vector relationships comprises a plurality of unique n-grams and their corresponding word vectors, wherein each of the word vectors represents a semantic context of a corresponding n-gram as a point in a d-dimensional embedding space;
look up, using the table, word vectors corresponding to each of the two input n-grams;
calculate an average vector by taking a weighted average of the word vectors corresponding to the two input n-grams;
select, using the table and based on a similarity metric, k word vectors closest to the average vector in the embedding space;
identify, for each of the selected word vectors, a corresponding n-gram by looking up the selected word vector in the table; and
send, to the second computing device, a response message, the response message comprising the identified n-grams.

14. The media of claim 13, wherein the plurality of unique n-grams in the table are selected from the constructed corpus of text.

15. The media of claim 13, wherein the word embedding model is a word2vec model.

16. The media of claim 13, wherein the looking up a word vector corresponding to each of the two input n-grams comprises looking up the n-gram in the table.

17. A system comprising:
one or more processors; and
one or more computer-readable non-transitory storage media coupled to one or more of the processors and comprising instructions operable when executed by one or more of the processors to cause the system to:
receive, from a second computing device, a request to generate k words that each approximates a representation of a relationship between two concepts, wherein the request comprises two input n-grams that each represents one of the two concepts, and wherein the request comprises one or more conditions characterizing an audience;
by the first computing device, identifying users of the online social network who satisfy the one or more conditions;
by the first computing device, constructing a corpus of text by collecting text content from content objects created by the identified users;
construct a table of word vector relationships by training a word embedding mode using the constructed corpus of text as training data, wherein the table of word vector relationships comprises a plurality of unique n-grams and their corresponding word vectors, wherein each of the word vectors represents a semantic context of a corresponding n-gram as a point in a d-dimensional embedding space;
look up, using the table, word vectors corresponding to each of the two input n-grams;
calculate an average vector by taking a weighted average of the word vectors corresponding to the two input n-grams;
select, using the table and based on a similarity metric, k word vectors closest to the average vector in the embedding space;
identify, for each of the selected word vectors, a corresponding n-gram by looking up the selected word vector in the table; and
send, to the second computing device, a response message, the response message comprising the identified n-grams.

* * * * *